United States Patent
Kojima

(10) Patent No.: US 8,319,569 B2
(45) Date of Patent: Nov. 27, 2012

(54) QUADRATURE AMPLITUDE MODULATOR AND QUADRATURE AMPLITUDE MODULATION METHOD

(75) Inventor: Shoji Kojima, Tokyo (JP)

(73) Assignee: Advantest Corporation, Tokyo (JP)

( * ) Notice: Subject to any disclaimer, the term of this patent is extended or adjusted under 35 U.S.C. 154(b) by 211 days.

(21) Appl. No.: 12/663,689

(22) PCT Filed: Oct. 7, 2008

(86) PCT No.: PCT/JP2008/002829
§ 371 (c)(1),
(2), (4) Date: Dec. 8, 2009

(87) PCT Pub. No.: WO2010/041293
PCT Pub. Date: Apr. 15, 2010

(65) Prior Publication Data
US 2011/0074518 A1   Mar. 31, 2011

(51) Int. Cl.
*H04L 27/20* (2006.01)
*H04L 5/12* (2006.01)
*H04L 27/36* (2006.01)
*H03C 1/00* (2006.01)

(52) U.S. Cl. ........ 332/104; 332/103; 332/105; 332/149; 375/261; 375/264; 375/279; 375/298; 375/308

(58) Field of Classification Search .......... 332/103–105, 332/149; 375/261, 264, 279, 298, 308, 329; 455/102
See application file for complete search history.

(56) References Cited

U.S. PATENT DOCUMENTS

| 5,652,552 | A | 7/1997 | Chung | 332/104 |
| 6,278,741 | B1 * | 8/2001 | Danzer et al. | 375/261 |
| 6,433,647 | B1 * | 8/2002 | Filoramo et al. | 332/103 |
| 6,470,055 | B1 * | 10/2002 | Feher | 375/259 |
| 6,560,293 | B1 * | 5/2003 | Alelyunas et al. | 375/261 |
| 6,987,814 | B2 * | 1/2006 | Iwamatsu et al. | 375/298 |
| 7,272,271 | B2 * | 9/2007 | Kaplan et al. | 385/3 |

FOREIGN PATENT DOCUMENTS

JP    2-148940 A    6/1990
(Continued)

OTHER PUBLICATIONS

International Preliminary Report on Patentability (IPRP) dated Apr. 12, 2011 in connection with PCT/JP2008/002829, and its English translation.

*Primary Examiner* — Levi Gannon
(74) *Attorney, Agent, or Firm* — Ladas & Parry, LLP

(57) ABSTRACT

A quadrature amplitude modulator is provided. An oscillator generates an in-phase carrier signal having a rectangular wave, a trapezoidal wave or a waveform similar to these, and a quadrature carrier signal, the phase of which is shifted by ¼ cycle relative to the in-phase carrier signal. A multi-level driver generates an in-phase modulated signal by amplitude modulating the in-phase carrier signal with an analog in-phase baseband signal having a discrete voltage level or current level in accordance with the in-phase baseband data. Likewise, the multi-level driver generates a quadrature modulated signal by amplitude modulating the quadrature carrier signal with an analog quadrature baseband signal having a discrete voltage level or current level in accordance with the quadrature baseband data The multi-level driver generates a modulated signal, the amplitude of which takes a discrete level, by combining the modulated signals together.

15 Claims, 11 Drawing Sheets

FOREIGN PATENT DOCUMENTS

| | | |
|---|---|---|
| JP | 4-318729 A | 11/1992 |
| JP | 6-284158 A | 10/1994 |
| JP | 8-56212 A | 2/1996 |
| JP | 8-213846 A | 8/1996 |
| JP | 8-508632 A | 9/1996 |
| JP | 11-313118 A | 11/1999 |
| JP | 2004-289576 A | 10/2004 |
| JP | 2008-92529 A | 4/2008 |

* cited by examiner

QUADRATURE AMPLITUDE MODULATOR AND QUADRATURE AMPLITUDE MODULATION METHOD

CROSS-REFERENCE TO RELATED APPLICATIONS

This application is the U.S. National Stage of International Patent Application No. PCT/JP2008/002829, filed on Oct. 7, 2008, the disclosure of which is incorporated herein by reference.

BACKGROUND OF THE INVENTION

1. Field of the Invention

The present invention relates to a technique for transmitting digital data.

2. Description of the Related Art

In a digital cable communication system, a binary transmission using the Time Division Multiplex (TDM) method has been conventionally the mainstream in which a large capacity transmission has been realized by a parallel transmission or a high-speed transmission. When the parallel transmission faces a physical limit, a serial transmission, i.e., a high-speed transmission at a data rate of several to more than 10 Gbps by using a high-speed interface (I/F) circuit is performed. However, there is also a limit to the increase in the speed of the data rate, causing a problem of high-frequency loss of a transmission line and deterioration of BER (Bit Error Rate) by reflection.

On the other hand, in a digital RF (Radio Frequency) communication system, multi-bit information is transmitted/received by being embedded in a carrier signal. That is, the data rate is not directly restricted by a carrier frequency. For example, in the QAM (Quadrature Amplitude Modulation) transmission method, most basic quadrature modulation/demodulation method, a 4-level transmission can be realized by a single channel. In 64-QAM, a 64-level transmission can be realized by one carrier signal. That is, a transmission capacity can be improved by such a multi-level modulation method without increasing the carrier frequency.

Such a modulation/demodulation method can be used in a cable communication system without being limited to a radio communication system, the use of which has already been started as PAM (Pulse Amplitude Modulation) system, QPSK (Quadrature Phase Shift Keying) system or DQPSK (Differential QPSK) system. In particular, in an optical communication field, it is important how much information can be embedded in a single optical fiber in terms of costs, and hence, a technical trend is shifting from the binary TDM to a transmission using these digital modulation methods. There is a possibility that, in the near future, these digital multi-level modulation/demodulation methods may be used in cable interfaces between devices including a memory and a SoC (System on a Tip).

[Patent Document 1] U.S. Pat. No. 5,652,552

Because a conventional quadrature amplitude modulator is required to be structured by using a high-speed device, design of the modulator is not easy, or a high-frequency bipolar process or Bi-CMOS process is needed. Therefore, there is a problem that production cost of the device becomes high.

SUMMARY OF THE INVENTION

The present invention has been made in view of these circumstances, and one of the illustrative purposes thereof is to provide a quadrature amplitude modulator that can be implemented as a logic circuit.

An embodiment of the present invention relates to a quadrature amplitude modulator configured to receive in-phase baseband data and quadrature baseband data, and to generate a modulated signal on which $(2N)^2$-level quadrature amplitude modulation is performed. The quadrature amplitude modulator comprises an oscillator and a multi-level driver. The oscillator generates an in-phase carrier signal having a rectangular wave, a trapezoidal wave or a waveform similar to these, and a quadrature carrier signal, the phase of which is shifted by ¼ cycle relative to the in-phase carrier signal. The multi-level driver generates an in-phase modulated signal by amplitude modulating the in-phase carrier signal with an analog in-phase baseband signal having a discrete voltage level or current level in accordance with the in-phase baseband data. The multi-level driver also generates a quadrature modulated signal by amplitude modulating the quadrature carrier signal with an analog quadrature baseband signal having a discrete voltage level or current level in accordance with the quadrature baseband data. The multi-level driver generates a modulated signal, the amplitude of which takes a discrete level, by combining the in-phase modulated signal with the quadrature modulated signal.

The aforementioned "a rectangular wave, a trapezoidal wave or a waveform similar to these" can also be considered to be a signal taking constant levels at the peak and the bottom of its cycle. According to the embodiment, the modulated signal discretized (quantized) in the amplitude direction can be generated by using a rectangular wave or a trapezoidal wave as a carrier signal, instead of a sine wave (cosine wave). The quadrature amplitude modulator can be implemented with a logic circuit being a main body.

The analog in-phase baseband signal and the analog quadrature baseband signal may have voltage values or current values quantized into equally-spaced levels, respectively. When each of the analog in-phase baseband signal and the analog quadrature baseband signal is quantized into N-levels, the modulated signal is discretized into the minimal (2N-1) levels, allowing the scale of the circuit to be suppressed.

Another embodiment of the present invention relates to a quadrature amplitude modulator configured to receive 2-bit, 4-level in-phase baseband data and 2-bit, 4-level quadrature baseband data, and to generate a modulated signal by performing 16-level quadrature amplitude modulation. The quadrature amplitude modulator comprises an oscillator, first through tenth switches, first through fourth current sources, and first and second resistors. The oscillator generates an in-phase carrier signal having a rectangular wave, a trapezoidal wave or a waveform similar to these, and a quadrature carrier signal, the phase of which is shifted by ¼ cycle relative to the in-phase carrier signal. The first switch includes first, second and third terminals such that the first terminal and the third terminal or the second terminal and the third terminal are electrically connected together in accordance with the first bit of the in-phase baseband data. The first current source is connected to the third terminal of the first switch to generate a predetermined reference current. The second switch includes first, second and third terminals such that the third terminal is connected to the first terminal of the first switch, and that the first terminal and the third terminal or the second terminal and the third terminal are electrically connected together, in accordance with the second bit of the in-phase baseband data. The third switch includes first, second and third terminals such that the third terminal is connected to the second terminal of the first switch, and that the first terminal and the third terminal or the second terminal and the third terminal are electrically connected together, in accordance with the second bit of the in-phase baseband data. The second current source is connected to the third terminal of the third switch to generate a current two times larger than the reference current. The fourth switch includes first, second and third terminals such that the third terminal is connected to the second terminal of the second switch and to the first terminal of the third switch, and that the first terminal and the third terminal or the second terminal and the third terminal are electrically connected together, in accordance with the in-phase carrier signal. The fifth switch includes first, second and third terminals such that the third terminal is connected to the first terminal of the second switch and to the second terminal of the third switch, and that the first terminal and the third terminal or the second terminal and the third terminal are electrically connected together, in accordance with the in-phase carrier signal. The sixth switch includes first, second and third terminals such that the first terminal and the third terminal or the second terminal and the third terminal are electrically connected together, in accordance with the first bit of the quadrature baseband data. The third current source is connected to the third terminal of the sixth switch to generate a predetermined reference current. The seventh switch includes first, second and third terminals such that the third terminal is connected to the first terminal of the sixth switch, and that the first terminal and the third terminal or the second terminal and the third terminal are electrically connected together, in accordance with the second bit of the quadrature baseband data. The eighth switch includes first, second and third terminals such that the third terminal is connected to the second terminal of the sixth switch, and that the first terminal and the third terminal or the second terminal and the third terminal are electrically connected together, in accordance with the second bit of the quadrature baseband data. The fourth current source is connected to the third terminal of the eighth switch to generate a current two times larger than the reference current. The ninth switch includes first, second and third terminals such that the third terminal is connected to the second terminal of the seventh switch and to the first terminal of the eighth switch, and that the first terminal and the third terminal or the second terminal and the third terminal are electrically connected together, in accordance with the quadrature carrier signal. The tenth switch includes first, second and third terminals such that the third terminal is connected to the first terminal of the seventh switch and to the second terminal of the eighth switch, and that the first terminal and the third terminal or the second terminal and the third terminal are electrically connected together, in accordance with the quadrature carrier signal. One end of the first resistor is applied with a reference voltage, and the other end thereof is connected to the first terminal of the fourth switch, to the second terminal of the fifth switch, to the first terminal of the ninth switch and to the second terminal of the tenth switch. One end of the second resistor is applied with the reference voltage, and the other end thereof is connected to the second terminal of the fourth switch, to the first terminal of the fifth switch, to the second terminal of the ninth switch and to the first terminal of the tenth switch. A signal occurring at least one of the other ends of the first and the second resistors is outputted as the modulated signal, the amplitude of which is discretized. According to the embodiment, a discretized 16-QAM signal can be generated.

Another embodiment of the present invention relates to a quadrature amplitude modulator configured to receive 2-bit, 4-level in-phase baseband data and 2-bit, 4-level quadrature baseband data, and to generate a modulated signal by performing 16-level quadrature amplitude modulation. The quadrature amplitude modulator comprises an oscillator, first and second exclusive NOR gates, first through fourth exclusive OR gates and third through sixth resistors. The oscillator generates an in-phase carrier signal having a rectangular wave, a trapezoidal wave or a waveform similar to these, and a quadrature carrier signal, the phase of which is shifted by ¼ cycle relative to the in-phase carrier signal. The first exclusive NOR gate receives the first bit and the second bit of the in-phase baseband data. The first exclusive OR gate receives an output of the first exclusive NOR gate and the in-phase carrier signal. The second exclusive OR gate receives the second bit of the in-phase baseband data and the in-phase carrier signal. The second exclusive NOR gate receives the first bit and the second bit of the quadrature baseband data. The third exclusive OR gate receives an output of the second exclusive NOR gate and the quadrature carrier signal. The fourth exclusive OR gate receives the second bit of the quadrature baseband data and the quadrature carrier signal. One end of the third resistor is applied with a voltage in accordance with an output of the first exclusive OR gate. One end of the fourth resistor is applied with a voltage in accordance with an output of the second exclusive OR gate. One end of the fifth resistor is applied with a voltage in accordance with an output of the third exclusive OR gate. One end of the sixth resistor is applied with a voltage in accordance with an output of the fourth exclusive OR gate. The resistance values of the fourth and the sixth resistors are equal to each other, and those of the third and the fifth resistors are respectively two times larger than those of the fourth and the sixth resistors. The other ends of the third, the fourth, the fifth and the sixth resistors are connected in common such that a voltage occurring at the commonly connected point is outputted as the modulated signal, the amplitude of which is discretized.

Another embodiment of the present invention relates to a quadrature amplitude modulator configured to receive 2-bit, 4-level in-phase baseband data and 2-bit, 4-level quadrature baseband data, and to generate a modulated signal by performing a 16-level quadrature amplitude modulation. The quadrature amplitude modulator comprises an oscillator, first and second exclusive NOR gates, first through fourth exclusive OR gates, an adder and a D/A converter. The oscillator generates an in-phase carrier signal having a rectangular wave, a trapezoidal wave or a waveform similar to these, and a quadrature carrier signal, the phase of which is shifted by ¼ cycle relative to the in-phase carrier signal. The first exclusive NOR gate receives the first bit and the second bit of the in-phase baseband data. The first exclusive OR gate receives an output of the first exclusive NOR gate and the in-phase carrier signal. The second exclusive OR gate receives the second bit of the in-phase baseband data and the in-phase carrier signal. The second exclusive NOR gate receives the first bit and the second bit of the quadrature baseband data. The third exclusive OR gate receives an output of the second exclusive NOR gate and the quadrature carrier signal. The fourth exclusive OR gate receives the second bit of the quadrature baseband data and the quadrature carrier signal. The adder adds outputs of the first, the second, the third and the fourth exclusive OR gates. The D/A converter converts an output of the adder into an analog signal. An output signal of the D/A converter is outputted as the modulated signal, the amplitude of which is discretized.

The quadrature amplitude modulator may further comprise a latch circuit that latches the output of the adder in accordance with a timing pulse asserted at every edge of the in-phase carrier signal and the quadrature carrier signal.

The adder may include: a fifth exclusive OR gate that receives outputs of the first exclusive OR gate and the third exclusive OR gate; a sixth exclusive OR gate that receives outputs of the second exclusive OR gate and the fourth exclusive OR gate; a first AND gate that receives the outputs of the first exclusive OR gate and the third exclusive OR gate; a second AND gate that receives the outputs of the second exclusive OR gate and the fourth exclusive OR gate; a third AND gate that receives outputs of the first AND gate and the sixth exclusive OR gate; a seventh exclusive OR gate that receives the outputs of the first AND gate and the sixth exclusive OR gate; and a first OR gate that receives outputs of the second AND gate and the third AND gate. Outputs of the fifth exclusive OR gate, the seventh exclusive OR gate and the first OR gate, may be outputted as an addition result.

The D/A converter may include eleventh through thirteenth switches, seventh and eighth resistors, first and second transistors, and eleventh, twelfth and thirteenth current sources. The eleventh switch includes first, second and third terminals such that the first terminal and the third terminal or the second terminal and the third terminal are electrically connected together, in accordance with the first bit of the output of the adder. The twelfth switch includes first, second and third terminals such that the first terminal and the third terminal or the second terminal and the third terminal are electrically connected together, in accordance with the second bit of the output of the adder. The thirteenth switch includes first, second and third terminals such that the first terminal and the third terminal or the second terminal and the third terminal are electrically connected together, in accordance with the third bit of the output of the adder. An electric potential at one end of each of the seventh and the eighth resistors is fixed. The first transistor is provided between the other end of the seventh resistor and the second terminals of the eleventh, the twelfth and the thirteenth switches, which are connected in common. The second transistor is provided between the other end of the eighth resistor and the first terminals of the eleventh, the twelfth and the thirteenth switches, which are connected in common. The eleventh, the twelfth and the thirteenth current sources supply currents to the respective third terminals of the eleventh, the twelfth and the thirteenth switches. A ratio of current values of the eleventh, the twelfth and the thirteenth current sources may be 1:2:4. The D/A converter outputs an electric potential at each of the other ends of the seventh and the eighth resistors.

The D/A converter may include: a ninth resistor, to one end of which a voltage corresponding to the first bit of the output of the adder is applied; a tenth resistor, to one end of which a voltage corresponding to the second bit thereof is applied; and an eleventh resistor, to one end of which a voltage corresponding to the third bit thereof is applied. A ratio of resistance values of the ninth, the tenth and the eleventh resistors may be 4:2:1. Further, each of the other ends of the three resistors may be connected in common, and a voltage occurring at the commonly connected point may be outputted.

The D/A converter may include an encoder that converters the output of the adder into a thermometer code, and a current summing circuit that performs current summing on each bit of an output of the encoder with equal weighting.

The D/A converter may include an encoder that converts the output of the adder into a thermometer code, and a voltage summing circuit that performs voltage summing on each bit of an output of the encoder with equal weighting.

Another embodiment of the present invention relates to a test apparatus configured to supply a digital multi-level modulated test signal to a device under test (DUT). The test apparatus comprises: a pattern generator configured to generate test data including in-phase and quadrature baseband data; and the quadrature amplitude modulator according to any one of the embodiments stated above configured to receive the test data and to generate a modulated signal.

Yet another embodiment of the present embodiment relates to a semiconductor apparatus. The apparatus comprises: a functional device configured to have a plurality of input/output (I/O) ports; and the quadrature amplitude modulator according to any one of the embodiments stated above configured to perform digital modulation on data outputted from the I/O ports of the functional device, and to output the modulated data to outside.

A quadrature amplitude modulation method for generating a multi-level $N^2$ quadrature modulated signal where n is a natural number, performs the following processing:

1. generating an in-phase carrier signal having a rectangular wave, a trapezoidal wave or a waveform similar to these, and a quadrature carrier signal, the phase of which is shifted by ¼ cycle relative to the in-phase carrier signal;

2. converting digital N-level in-phase baseband data to be transmitted, into a discrete analog in-phase baseband signal;

3. converting digital N-level quadrature baseband data to be transmitted, into a discrete analog quadrature baseband signal;

4. multiplying the analog in-phase baseband signal by the in-phase carrier signal to generate an in-phase modulated signal;

5. multiplying the analog quadrature baseband signal by the quadrature carrier signal to generate a quadrature modulated signal; and 6. combining the in-phase modulated signal with the quadrature modulated signal to generate a modulated signal, the amplitude of which takes a discrete level. The order of each step is not limited, but can be interchanged with each other as far as the processing is not impaired.

The amplitude of the modulated signal may be discretized into (2N-1) levels. In this case, the scale of the circuit can be suppressed.

In each of the steps of converting into the analog quadrature baseband signal and the analog in-phase baseband signal, the corresponding N-level baseband data maybe converted into a voltage value or a current value quantized into equally-spaced levels.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
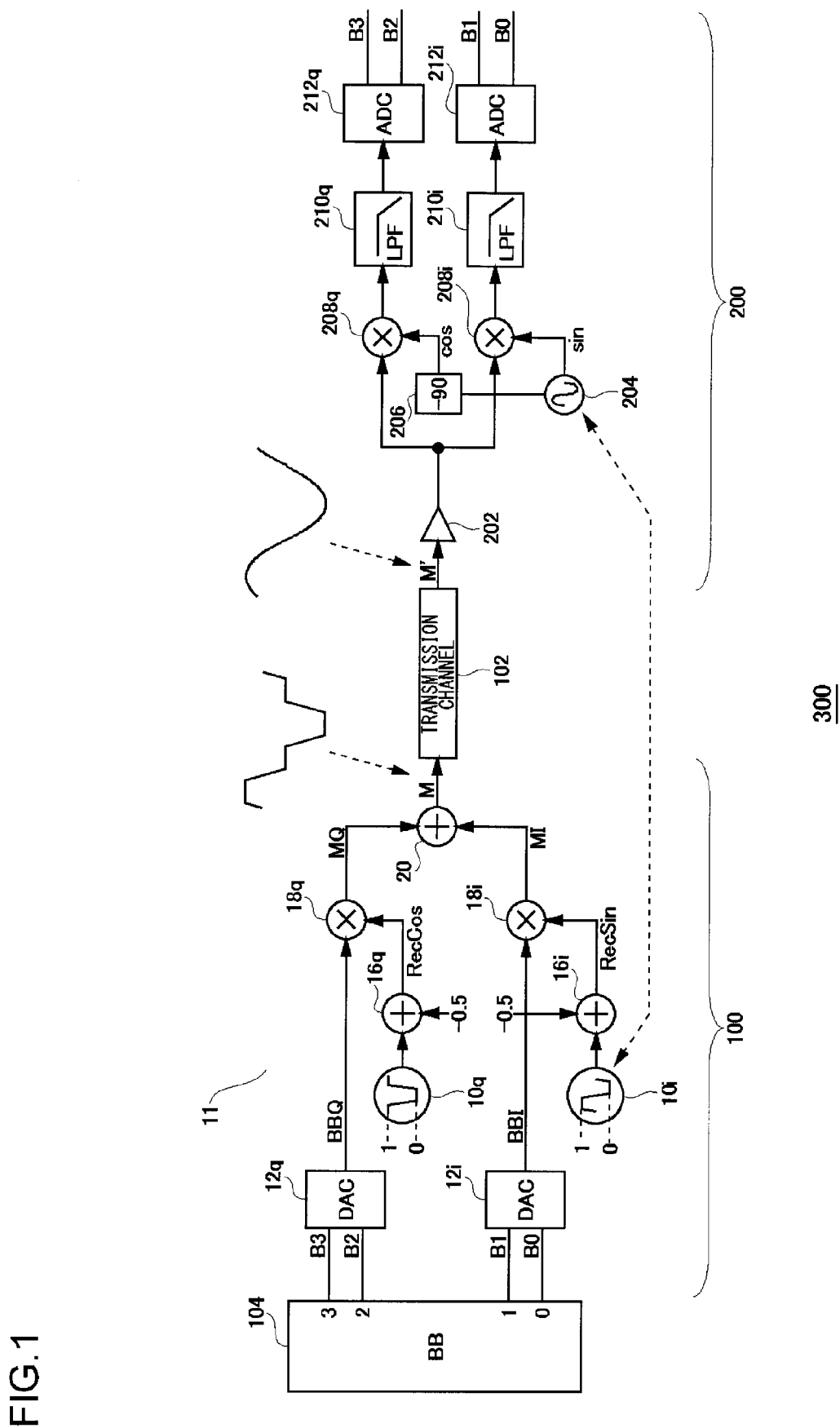
FIG. 1 is a circuit diagram illustrating the structure of a transmission system using a quadrature amplitude modulator according to an embodiment.

The present invention will be described below with reference to the drawings based on the preferred embodiments. The same or equivalent constituting elements, members and processing illustrated in each drawing shall be denoted by the same reference numerals, and the duplicative explanations will be omitted appropriately. The embodiments do not intend to limit the scope of the present invention, but exemplify the invention. All of the features and the combinations thereof described in the embodiments are not necessarily essential to the invention.

Herein, "the state where a member A is connected to a member B" includes not only the state where the member A is physically and directly connected to the member B but also the state where the member A is indirectly connected to the member B via another member that does not affect electrically the connection state between them. Likewise, "the state where a member C is provided between a member A and a member B" includes not only the state where the member A and the member C, or the member B and the member C, are connected directly, but also the state where they are connected indirectly via another member that does not affect electrically the connection state between them.

FIG. 1 is a circuit diagram illustrating the structure of a transmission system 300 using a quadrature amplitude modulator 100 according to an embodiment. The transmission system 300 comprises the quadrature amplitude modulator 100, a transmission channel 102, a baseband data generator 104 and a demodulator 200. The quadrature amplitude modulator 100 generates a modulated signal M on which multi-level quadrature amplitude modulation such as 16-QAM, 64-QAM, 256-QAM and the like, is performed such that the modulated signal M is transmitted to the demodulator 200 via the transmission channel 102. Herein, generalizing such quadrature amplitude modulations, the $N^2$-level quadrature amplitude modulation is intended to be performed. The transmission system 300 is, as an example, used for transmitting data between separate semiconductor devices. In this case, the baseband data generator 104 and the quadrature amplitude modulator 100 are mounted in the semiconductor device on the transmission side, and the demodulator 200 is in the semiconductor device on the reception side.

The baseband data generator 104 generates m-bit in-phase baseband data and m-bit quadrature baseband data, where m is a natural number. When converting each of the baseband data into an analog signal by using a binary-type D/A converter, the analog baseband signal can take levels of $N=2^m$. In FIG. 1, the case where m=2 is exemplified in which the respective baseband data are denoted by 2-bits (B0, B1) and (B2, B3), illustrating a circuit executing 16-level QAM. The present invention is also effective to the other 64-QAM and 256-QAM. Each baseband data is not necessarily needed to take $2^m$-level, and may be an arbitrary natural number. Generally, signal design is made such that each of the IQ components of the baseband data takes an even number. However, in the quadrature amplitude modulator 100 according to the embodiment, it is acceptable that the IQ component thereof takes an odd number, and a symbol may be arranged at the zero point. Even when a symbol is arranged at the zero point, there occurs no problem with respect to linearity (distortion) of the symbol, by outputting the symbol via a multi-level driver, which will be described below, allowing the symbol to be extracted also on the reception side.

The quadrature amplitude modulator 100 receives the $(2^m)$-level in-phase baseband data (B1, B0) and the $(2^m)$-level quadrature baseband data (B3, B2), and generates a modulated signal M on which $(2^m)^2$-level quadrature amplitude modulation is performed. The quadrature amplitude modulator 100 comprises oscillators 10i and 10q and a multi-level driver 11 (12i, 12q, 16i, 16q, 18i, 18q and 20).

Unlike a conventional quadrature amplitude modulator using a sine wave or a cosine wave as a carrier signal, the quadrature amplitude modulator 100 according to the embodiment uses a carrier signal having a rectangular wave, a trapezoidal wave or a waveform similar to these. The aforementioned "a rectangular wave, a trapezoidal wave or a waveform similar to these" can also be considered to be a signal taking constant levels at the peak and the bottom of its cycle.

Each of the oscillators 10i and 10q generates the in-phase carrier signal RecSin having a rectangular wave, a trapezoidal wave or a waveform similar to these, and the quadrature carrier signal RecCos, the phase of which is shifted by ¼ cycle relative to the in-phase carrier signal RecSin.

The multi-level driver 11 performs the following processing:

generating an in-phase modulated signal MI by amplitude modulating the in-phase carrier signal RecSin with the analog in-phase baseband signal BBI having a discrete voltage level or current level in accordance with the in-phase baseband data (B1, B0);

generating a quadrature modulated signal MQ by amplitude modulating the quadrature carrier signal RecCos with the analog quadrature baseband signal BBQ having a discrete voltage level or current level in accordance with the quadrature baseband data (B3, B2); and generating a modulated signal M, the amplitude of which takes a discrete level, by combining the in-phase modulated signal MI with the quadrature modulated signal MQ.

The frequency of the in-phase carrier signal RecSin and the quadrature carrier signal RecCos may be equal to that of the baseband data, or equal to an integral multiple of the symbol rate. In other words, the carrier frequency may be equal to the symbol rate, or equal to an integral multiple of the symbol rate.

The aforementioned "a rectangular wave, a trapezoidal wave or a waveform similar to these" can also be considered to be a signal taking constant levels at the peak and the bottom of its cycle. According to the embodiment, a modulated signal discretized (quantized) in the amplitude direction can be generated by using a rectangular wave or a trapezoidal wave as a carrier signal, instead of a sine wave (cosine wave). The quadrature amplitude modulator can be implemented with a logic circuit being a main body.

The multi-level driver 11 comprises D/A converters 12$i$ and 12$q$, adders 16$i$ and 16$q$, mixers 18$i$ and 18$q$, and adder 20.

The D/A converters 12$i$ and 12$q$ convert the baseband data (B1, B0) and (B3, B2) into the analog baseband signals BBI and BBQ, respectively. The analog baseband signals BBI and BBQ have voltage values or current values obtained by quantizing the corresponding baseband data (B1, B0) and (B3, B2) into equally-spaced levels, respectively. The correspondence relationship between the amplitudes of the baseband data and the analog baseband signal is as follows.

| (B1, B0) | BBI |
|---|---|
| (0, 0) | −1 |
| (0, 1) | +1 |
| (1, 0) | −3 |
| (1, 1) | +3 |

In this case, the finally obtained modulated signal M is discretized into $(2N-1)=(2\times 2^m -1)$ levels, as stated below. The number of the levels becomes minimal, allowing the scale of the circuit to be suppressed. The baseband data (B1, B0) is Hamming coded such that the baseband data of adjacent symbols differ from each other by 1 bit. The same is true with the Q phase side.

The adders 16$i$ and 16$q$ shift the corresponding carrier signals RecSin and RecCos to suitable levels, respectively. If the carrier signals RecSin and RecCos are normalized such that the peak levels thereof are 1 and the bottom levels thereof are 0, the adders 16$i$ and 16$q$ shift the carrier signals by 0.5 in the negative direction. The adders 16$i$ and 16$q$ are illustrated for convenience and easy understanding of the following analyses, and hence, there is no need for the adders to be present as actual circuit blocks.

The mixers 18$i$ and 18$q$ multiply the analog baseband signals BBI and BBQ by the corresponding carrier signals RecSin and RecCos, respectively. Namely, the mixer 18 amplitude modulates the carrier signal with the baseband signal being as a modulating signal. The modulated signals MI and MQ are outputted from the mixers 18$i$ and 18$q$, respectively.

The adder 20 adds the modulated signal MI on the I-phase side and the modulated signal MQ on the Q-phase side together. The modulated signal M thus generated is represented by the following mathematical expressions:

$$M=MI+MQ;$$

$$MI=BBI\times(\text{Rec Sin}-0.5);$$

$$MQ=BBQ\times(\text{Rec Cos}-0.5);$$

$$BBI=(1+2\times B1)\times(2\times B0-1); \text{ and}$$

$$BBQ=(1+2\times B3)\times(2\times B2-1).$$

By rearranging the above expressions, the following expressions can be obtained:

$$M=(1+2\times B1)\times(2\times B0-1)\times(\text{Rec Sin}-0.5)+(1+2\times B3)\times(2\times B2-1)\times(\text{Rec Cos}-0.5) \quad (1).$$

Figure 2:
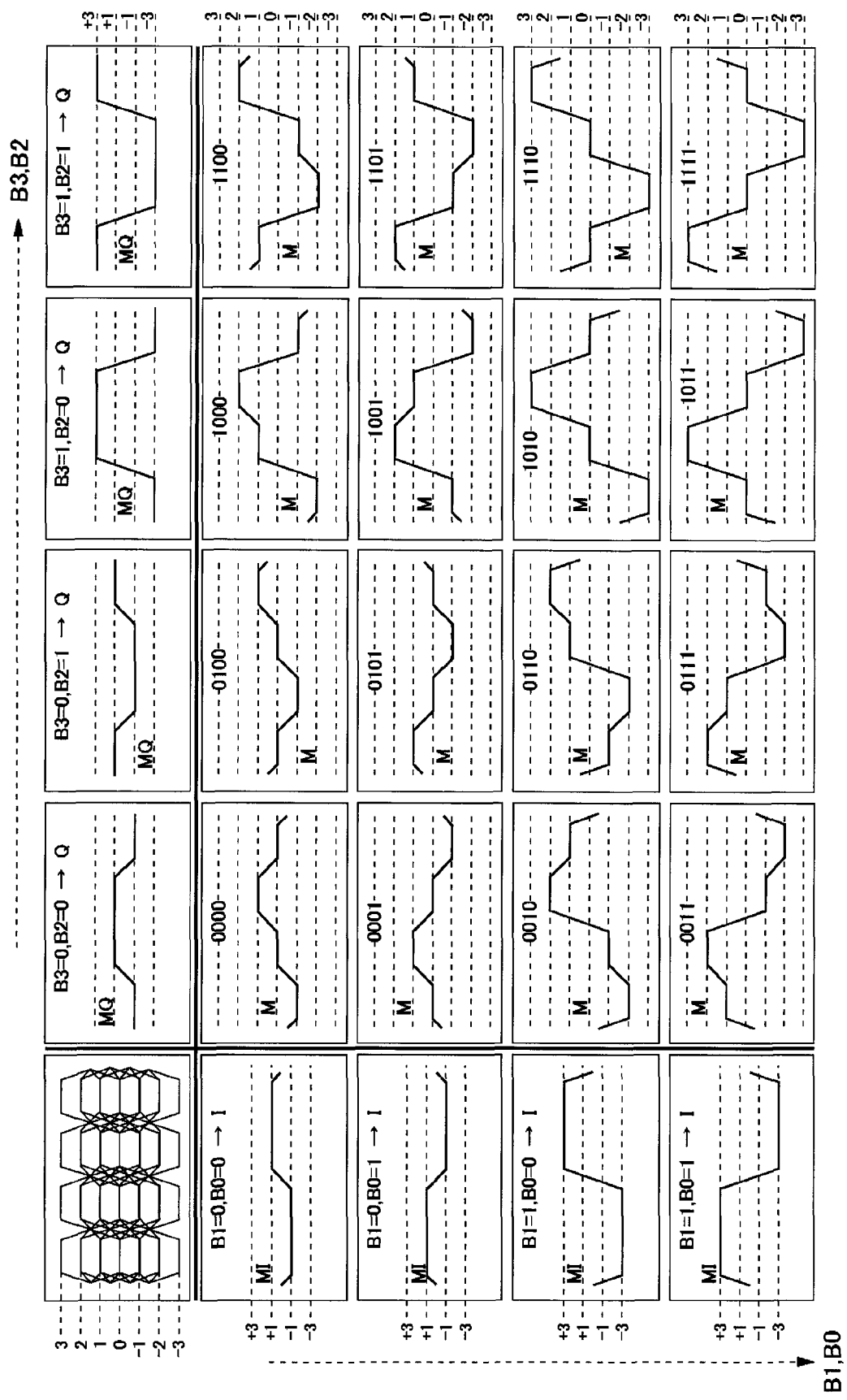
FIG. 2 is a diagram illustrating combinations of IQ baseband data and the relationship with modulated signals corresponding thereto.

FIG. 2 illustrates combinations of each of the baseband data (B1, B0) and (B3, B2), and the relationship with modulated signals corresponding thereto. As stated above, by discretizing (quantizing) the analog baseband signals BBI and BBQ so that symbol points are equally-spaced from each other, and by using a rectangle or trapezoidal carrier signal, the amplitude of the modulated signal M is discretized so as to take any one of values of (3, 2, 1, 0, −1, −2, −3). That is, the quadrature amplitude modulator according to the embodiment is suitable for implementation by a digital (logic) circuit rather than an analog high-frequency circuit.

Figure 3:
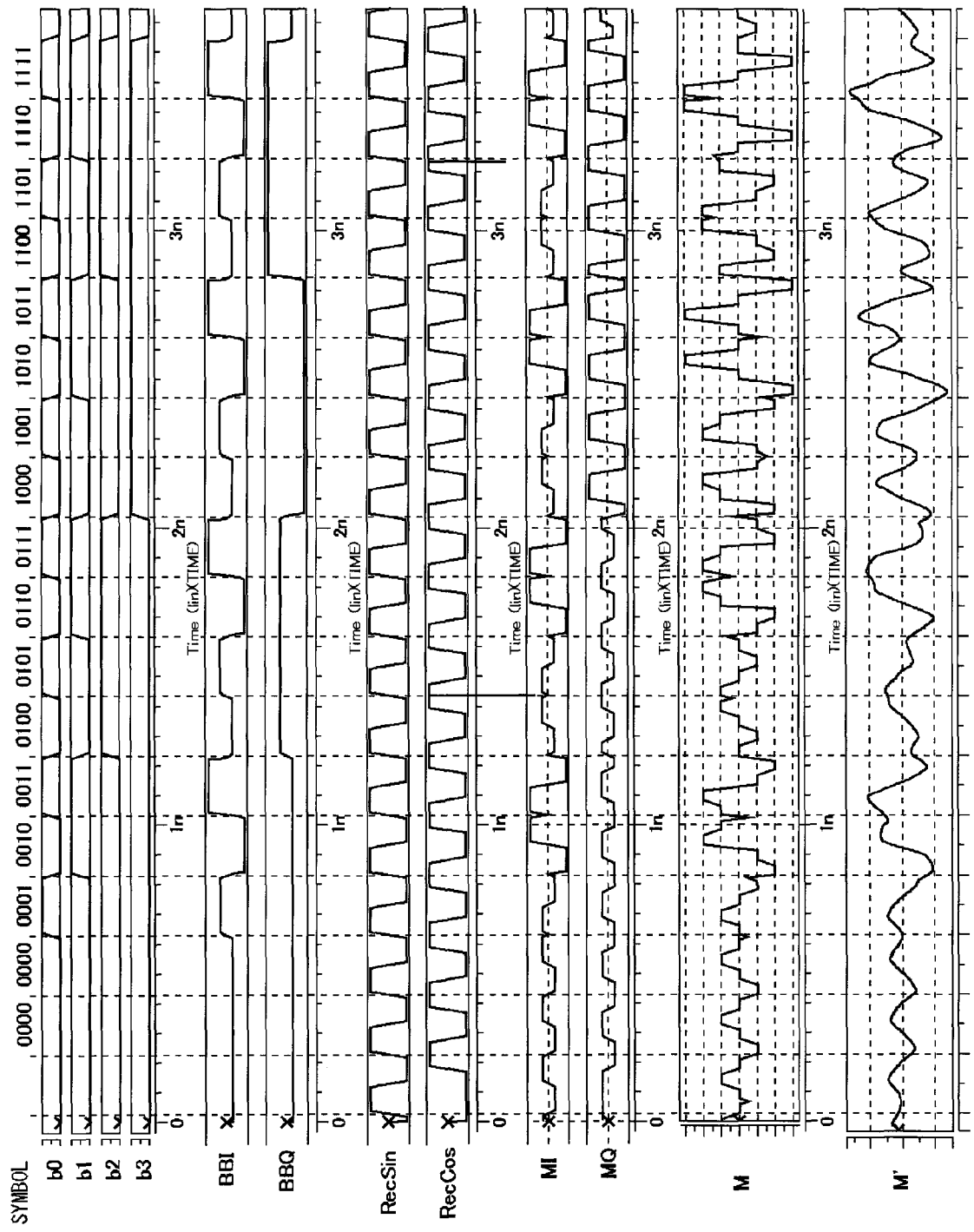
FIG. 3 is time charts illustrating operations of the quadrature amplitude modulator.

FIG. 3 is a time chart illustrating operations of the quadrature amplitude modulator 100. The modulated signal M' shown in the lowest chart illustrates a waveform of a modulated signal that has been propagated through a differential stripline having a length of 90 cm. It can be understood that, because the transmission channel 102 acts as a low-pass filter to the modulated signal M, the modulated signal M' to reach the demodulator 200 has a waveform similar to that of the 16-QAM modulated signal when a sine wave is used as a carrier signal. The demodulator 200 can demodulate the modulated signal M, even if the waveform thereof is blunt or not Referring back to FIG. 1, the demodulator 200 has the structure of a typical quadrature demodulator. The demodulator 200 includes an amplifier 202, an oscillator 204, a phase shifter 206, mixers 208$i$ and 208$q$, low-pass filters 210$i$ and 210$q$, and A/D converters 212$i$ and 212$q$. The oscillator 204 generates a periodic signal "sin" to be a reference signal (herein, it is assumed to be a sine wave signal). The phase shifter 206 shifts the phase of the sine wave signal "sin" by 90° to generate a periodic signal "cos" that is orthogonal to the periodic signal "sin". The amplifier 202 amplifies the received modulated signal M'. The mixers 208$i$ and 208$q$ respectively multiply the received modulated signal M' by the periodic signals "sin" and "cos" to extract analog baseband components. The low-pass filters 210$i$ and 210$q$ respectively remove high-frequency components in the outputs of the mixers 208$i$ and 208$q$. The A/D converters 212$i$ and 212$q$ perform A/D conversion on the corresponding outputs of the low-pass filters 210$i$ and 210$q$. In this way, the baseband data B0 through B3 generated in the quadrature amplitude modulator 100 can be demodulated.

Subsequently, a variation of the multi-level driver 11 (quadrature amplitude modulator 100) in FIG. 1 will be described.

Figure 4A:
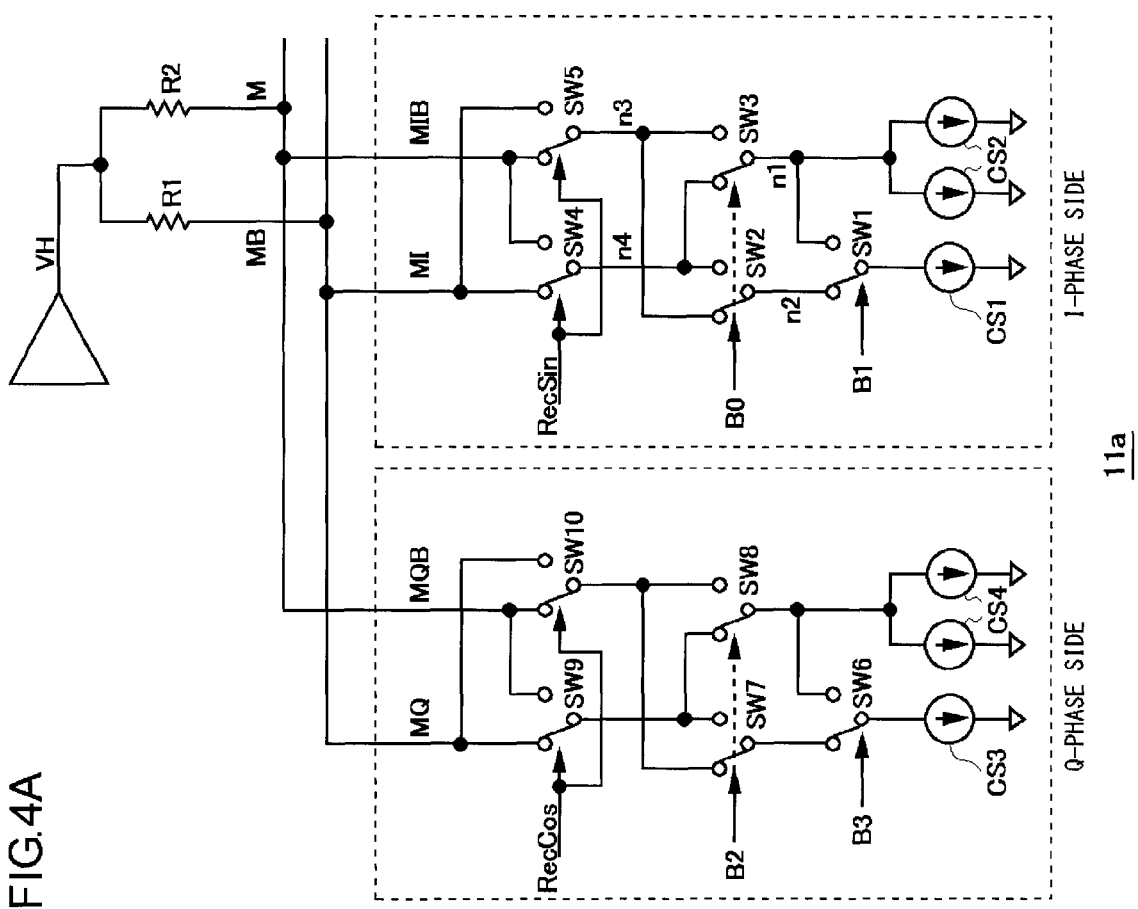
FIGS. 4A to 4C are circuit diagrams illustrating the structure of a multi-level driver according to a first variation.
Figure 4B:
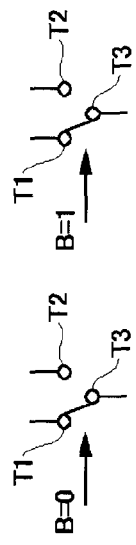
Figure 4C:
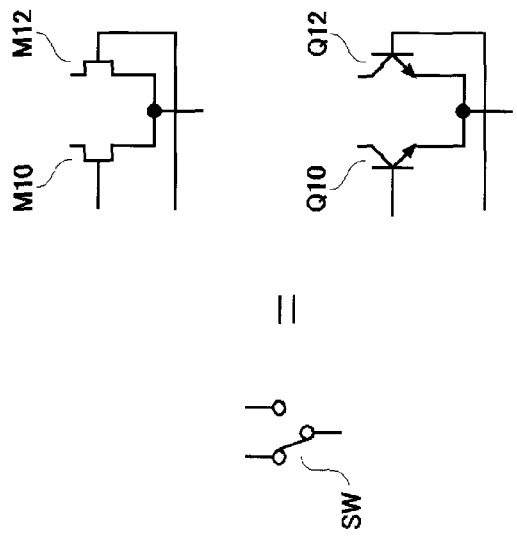

FIGS. 4A to 4C are circuit diagrams illustrating the structure of a multi-level driver 11$a$ according to a first variation. FIG. 4A illustrates the structure of the multi-level driver 11$a$, FIG. 4B an operational state of a switch SW used in the multi-level driver 11$a$, and FIG. 4C an example of the structure of the switch SW.

The multi-level driver 11$a$ comprises: first through tenth switches SW1 through SW10; first through fourth current sources CS1 through CS4; and first and second resistors R1 and R2.

As illustrated in FIG. 4B, each of the switches SW1 through SW10 includes first, second and third terminals T1, T2 and T3 such that the first terminal T1 and the third terminal T3 or the second terminal T2 and the third terminal T3 are electrically connected together, in accordance with the level of an inputted control signal. As illustrated in FIG. 4C, the switch SW can be structured with a differential pair of transistors, for example, MOSFETs or bipolar transistors. The switch SW is not limited to those in FIG. 4C as far as the same function is realized.

Referring back to FIG. 4A, the multi-level driver 11$a$ uses a so-called Gilbert Cell mixer circuit, which is structured in the same way between the in-phase component side and the quadrature component side.

A conduction state of the first switch SW1 is controlled in accordance with the first bit B1 of the in-phase baseband data. The first current source CS1 is connected to the third terminal T3 of the first switch SW1 to generates a predetermined reference current I. The third terminal T3 of the second switch SW2 is connected to the first terminal T1 of the first switch SW1. A conduction state of the second switch is controlled in accordance with the second bit B0 of the in-phase baseband data.

The third terminal T3 of the third switch SW3 is connected to the second terminal T2 of the first switch SW1. A conduction state of the third switch is controlled in accordance with the second bit B0 of the in-phase baseband data. The second current source CS2 is connected to the third terminal T3 of the third switch SW3 to generate a current 2×I, which is two times as large as the reference current I.

The third terminal T3 of the fourth switch SW4 is connected to the second terminal T2 of the second switch SW2 and the first terminal T1 of the third switch SW3. A conduction state of the fourth switch is controlled in accordance with the in-phase carrier signal RecSin.

The third terminal T3 of the fifth switch SW5 is connected to the first terminal T1 of the second switch SW2 and the second terminal T2 of the third switch SW3. A conduction state of the fifth switch is controlled in accordance with the in-phase carrier signal RecSin. The sixth switch SW6 conducts the first terminal and the third terminal or the second terminal and the third terminal in accordance with the first bit of the quadrature baseband data.

The switches SW6 through SW10 and the current sources CS3 and CS4, on the quadrature components side, respectively correspond to the switches SW1 through SW5 and the current sources CS1 and CS2d, on the in-phase components side.

One end of the first resistor R1 is applied with a stabilized reference voltage VH, and the other end thereof is connected to the first terminal T1 of the fourth switch SW4, to the second terminal T2 of the fifth switch SW5, to the first terminal T1 of the ninth switch SW9, and to the second terminal T2 of the tenth switch SW10. One end of the second resistor R2 is applied with the reference voltage VH, and the other end thereof is connected to the second terminal T2 of fourth switch SW4, to the first terminal T1 of the fifth switch SW5, to the second terminal T2 of the ninth switch SW9, and to the first terminal T1 of the tenth switch SW10. At least one of signals M and MB occurring at the other ends of the first resistor R1 and the second resistor R2 is outputted as the modulated signal M, the amplitude of which is discretized. Because the signals M and MB are complementary differential signals, both of the signals may be outputted as a differential signal.

Each component of the multi-level driver 11a in FIG. 4A can be equivalent to that of the multi-level driver 11 in FIG. 1. That is, the current sources CS1 and CS2 and the switches SW1 through SW3 are equivalent to the D/A converter 12i in FIG. 1, through the node n3 and n4 of which currents corresponding to the in-phase baseband data B1 and B0 flow.

When the structures of the fourth switch SW4, the fifth switch SW5, the first resistor R1 and the second resistor R2 are added to the portion corresponding to the D/A converter 12i, it is understood as a double balance-type Gilbert Cell mixer; and hence, it can be equivalent to the mixer 18i in FIG. 1. The same is true with the quadrature component side.

Because the Gilbert Cell mixers on the in-phase component side and the quadrature component side use in common the first resistor R1 and the second resistor R2 that are loads, a voltage drop across the first resistor R1 and a voltage drop across the second resistor R2 become a sum of multiplication results on the in-phase component side and the quadrature component side. That is, the first resistor R1 and the second resistor R2 that are used in common can be equivalent to the adder 20 in FIG. 1.

Operations of the multi-level driver 11a in FIG. 4A is as follows. Paying attention to a current on the in-phase component side, a current I flows through the node n2 side and a current 2I through the node n1 side, when the data B1 is 0. When the data B1 is 1, a current does not flow through the node n2 side, but a current 3I flows through the node n1 side. This relationship is represented by the following expressions:

$i(n1)=I\times(2+B1)$; and $i(n2)=I\times(1-B1)$.

Currents flowing through other nodes n3, n4, MI and MIB are represented by the following expressions:

$i(n3)=i(n1)\times B0+i(n2)\times(1-B0)$;

$i(n4)=i(n1)\times(1-B0)+i(n2)\times B0$;

$i(MI)=i(n3)\times \text{Rec Sin}+i(n4)\times(1-\text{Rec Sin})$; and $i(MIB)=i(n3)\times(1-\text{Rec Sin})+i(n4)\times \text{Rec Sin}$.

Herein, the differential current component i(MI)−i(MIB) is calculated by the following expression:

$i(MI)-i(MIB)=i(n3)\times \text{Rec Sin}+i(n4)\times(1-\text{Rec Sin})-\{i(n3)\times(1-\text{Rec Sin})+i(n4)\times \text{Rec Sin}\}=I\times(2\times B1+1)\times(2\times B0-1)\times(2\times \text{Rec Sin}-1)$.

Likewise, the differential current component i(MQ)−i(MQB) on the quadrature component side is calculated by the following expression:

$i(MQ)-i(MQB)=I\times(2\times B3+1)\times(2\times B2-1)\times(2\times \text{Rec Cos}-1)$.

Paying attention to outputs of nodes, the following expressions are obtained:

$i(M)=i(MIB)+i(MQB)$;

$i(MB)=i(MI)+i(MQ)$;

$v(M)=VH-R\times i(M)$; and $v(MB)=VH-R\times i(MB)$.

Therefore, the differential amplitude is obtained by the following expression:

$$v(M)-v(MB)=R\times\{i(MI)+i(MQ)-i(MIB)-i(MQB)\}=I\times R\times\{(2\times B1+1)\times(2\times B0-1)\times(2\times \text{Rec Sin}-1)+(2\times B3+1)\times(2\times B2-1)\times(2\times \text{Rec Cos}-1)\} \quad (2)$$

When I×R=0.5 is held, the expression (2) is completely equivalent to the expression (1), and hence, it can be understood that a discretized 16-QAM signal is preferably generated by the multi-level driver 11a in FIG. 4A.

Figure 5:
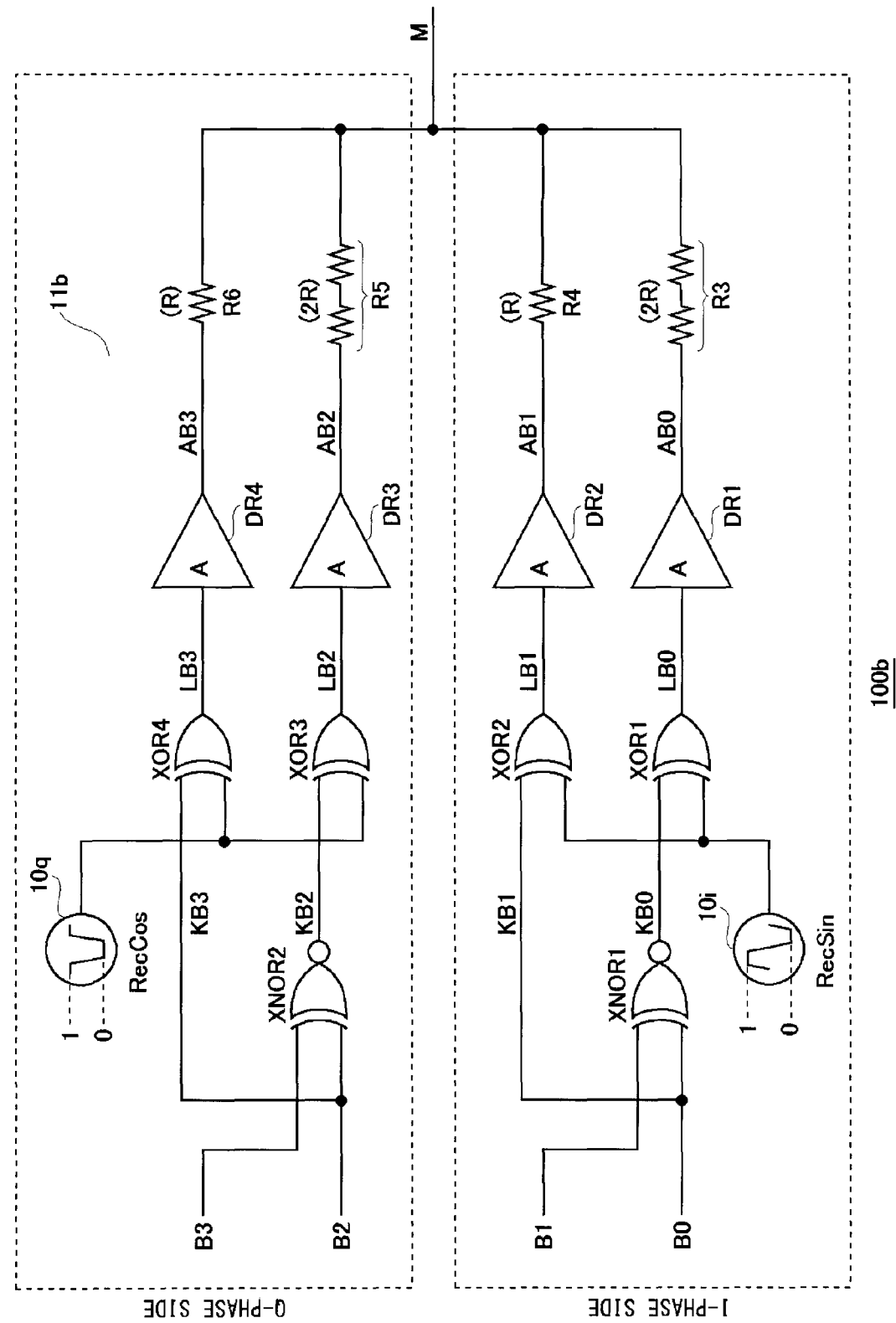
FIG. 5 is a circuit diagram illustrating the structure of a quadrature amplitude modulator according to a second variation.

FIG. 5 is a circuit diagram illustrating the structure of a quadrature amplitude modulator 100b according to a second variation. The quadrature amplitude modulator 100b in FIG. 5 has a feature that the modulator 100b is structured as a pure logic circuit. The quadrature amplitude modulator 100b is structured with oscillators 10i and 10q and a multi-level driver 11b.

The multi-level driver 11b includes several logic gates and a third resistor R3 through a sixth resistor R6. A first exclusive NOR gate XNOR1 receives the first bit B1 and the second bit B2 of the in-phase baseband data. A first exclusive OR gate XOR1 receives an output of the first exclusive NOR gate XNOR1, and the in-phase carrier signal Rec Sin. A second exclusive OR gate XOR2 receives the second bit B0 of the in-phase baseband data, and the in-phase carrier signal Rec-Sin. A second exclusive NOR gate XNOR2 receives the first bit B3 and the second bit B2 of the quadrature baseband data. A third exclusive OR gate XOR3 receives an output of the second exclusive NOR gate XNOR2, and the quadrature carrier signal RecCos. A fourth exclusive OR gate XOR4 receives the second bit B2 of the quadrature baseband data, and the quadrature carrier signal RecCos. Drivers DR1 through DR4 respectively apply voltages AB0 through AB3 to the corresponding ends of the third resistor R3 through the sixth resistor R6 in accordance with outputs of the corresponding exclusive OR gates XOR1 through XOR4. The voltages AB0 through AB3 take two levels of the low-level (0 [volt]) or the high-level (A [volt]), respectively. Accordingly, the driver DR can be structured with a CMOS buffer. When the exclusive OR gates XOR1 through XOR4 have sufficient driving capability, the drivers DR1 through DR4 become unnecessary. Resistance values of the fourth resistor R4 and the sixth resistor R6 are equal to each other, and the resistance value of each of the third resistor R3 and the fifth resistor R5 is two time larger than that of each of the fourth resistor R4 and the sixth resistor R6. The other ends of the third resistor R3 through the sixth resistor R6 are connected in common, and a voltage occurring at the commonly connected point is outputted as the modulated signal M, the amplitude of which is discretized.

The reason why the processing equivalent to that by the quadrature amplitude modulator 100 in FIG. 1 can be realized by the quadrature amplitude modulator 100b in FIG. 5, will be clear from the following discussion.

The modulated signal M is calculated by the following expression:

$$M=A/6\times(LB0+2\times LB1+LB2+2\times LB3) \quad (3.1)$$

From the relationship between the inputs and the outputs of the XOR gates, the following expressions can be obtained:

$$LB0=KB0\times(1-Rec\ Sin)+(1-KB0)\times Rec\ Sin$$

$$=KB0\times(1-2\times Rec\ Sin)+Rec\ Sin;\ \text{and}$$

$$LB1=KB1\times(1-Rec\ Sin)+(1-KB1)\times Rec\ Sin$$

$$=KB1\times(1-2\times Rec\ Sin)+Rec\ Sin.$$

From the relationship between the inputs and the outputs of the XNOR gates, the following expressions can be obtained:

$$KB0=1-B1\times(1-B0)-B0\times(1-B1)$$

$$=1-B0-B1\times(1-2\times B0);\ \text{and}$$

$$KB1=B0.$$

Summarizing the above expressions, the following expression can be obtained on the in-phase component side:

$$LB0+2\times LB1=KB0\times(1-2\times Rec\ Sin)+2\times KB1\times(1-2\times Rec\ Sin)+3\times Rec\ Sin=(1-2\times Rec\ Sin)\times(-B1\times(1-2\times B0)+1+B0)+3\times Rec\ Sin=(1-2\times Rec\ Sin)\times(-0.5\times(2\times B1+1)\times(1-2\times B0)+3/2)+3\times Rec\ Sin=-0.5\times(1-2\times Rec\ Sin)\times(2\times B1+1)\times(1-2\times B0)+3/2 \quad (3.2).$$

Likewise, the expression (3.3) can be obtained on the quadrature component side:

$$LB2+2\times LB3=-0.5\times(1-2\times Rec\ Cos)\times(2\times B3+1)\times(1-2\times B2)+3/2 \quad (3.3)$$

When substituting the expression (3.2) and (3.3) into the expression (3.1), the expression (3.4) can be obtained:

$$M=A/2-A/12\times\{(2\times Rec\ Sin-1)\times(2\times B1+1)\times(2\times B0-1)+(2\times Rec\ Cos-1)\times(2\times B3+1)\times(2\times B2-1)\} \quad (3.4).$$

Although the expression (3.4) includes an offset term and has an inverted sign, it can be understood that the expression is essentially equivalent to the expression (1). That is, according to the quadrature amplitude modulator 100b in FIG. 5, the discretized 16-QAM signal can be generated in the same way as the quadrature amplitude modulator 100 in FIG. 1.

The quadrature amplitude modulator 100b in FIG. 5 preferentially performs multiplications of the baseband data by the carrier signals. Thereafter, by summing the multiplication results, the processing corresponding to D/A conversion is performed.

Components of the quadrature amplitude modulator 100b in FIG. 5 can be equivalent to those of the quadrature amplitude modulator 100 in FIG. 1 as follows. That is, paying attention to the in-phase component side, the gates XOR1 and XOR2 in FIG. 5 correspond to the mixer 18i in FIG. 1. The drivers DR1 and DR2 and the resistors R3 and R4 in FIG. 5 correspond to the D/A converter 12i in FIG. 1. Also, it can be understood that the resistors R3 through R6 in FIG. 5 correspond to the adder 20 in FIG. 1.

When the transmission line having a characteristic impedance Z0 is connected to the output node where the modulated signal M is generated, it is preferable that impedance match can be achieved by satisfying R=3×Z0.

Figure 6:
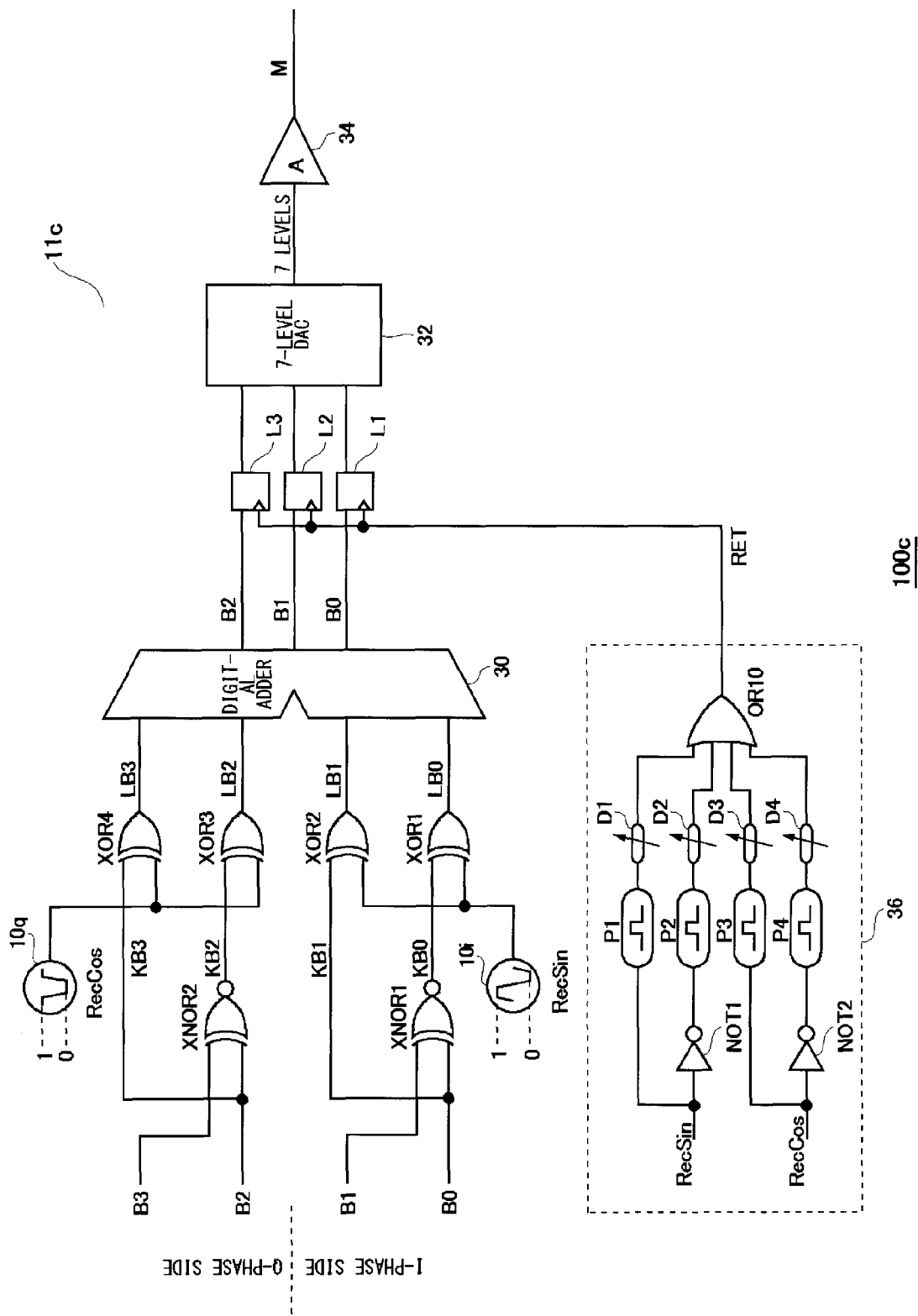
FIG. 6 is a circuit diagram illustrating the structure of a quadrature amplitude modulator according to a third variation.

FIG. 6 is a circuit diagram illustrating the structure of a quadrature amplitude modulator 100c according to a third variation. The quadrature amplitude modulator 100c includes oscillators 10i and 10q and a multi-level driver 11c. The quadrature amplitude modulator 100b in FIG. 5 is a circuit executing an analog addition represented by the expression (3.1). In contrast, the quadrature amplitude modulator 100c in FIG. 6 differs therefrom in that the modulator 100c executes a digital addition and then performs D/A conversion.

The multi-level driver 11c includes logic gates XNOR1, XNOR2 and XOR1 through XOR4, a digital adder 30, latches L1 through L3, a 7-level D/A converter 32, a linear amplifier 34 and a retiming pulse generator 36.

The exclusive NOR gates XNOR1 and XNOR2, the exclusive OR gates XOR1 through XOR4 and the oscillators 10i and 10q, are connected in the same way as that in FIG. 5. The digital adder 30 adds together output data LB0 through LB3 of the exclusive OR gates XOR1 through XOR4. The latches L1 through L3 latch the data B2 through B0 from the digital adder 30 at the timing of the retiming pulse RET generated by the retiming pulse generator 36. The retiming pulse RET is asserted at every positive edge and negative edge of the in-phase carrier signal RecSin and the quadrature carrier signal RecCos.

Figure 7:
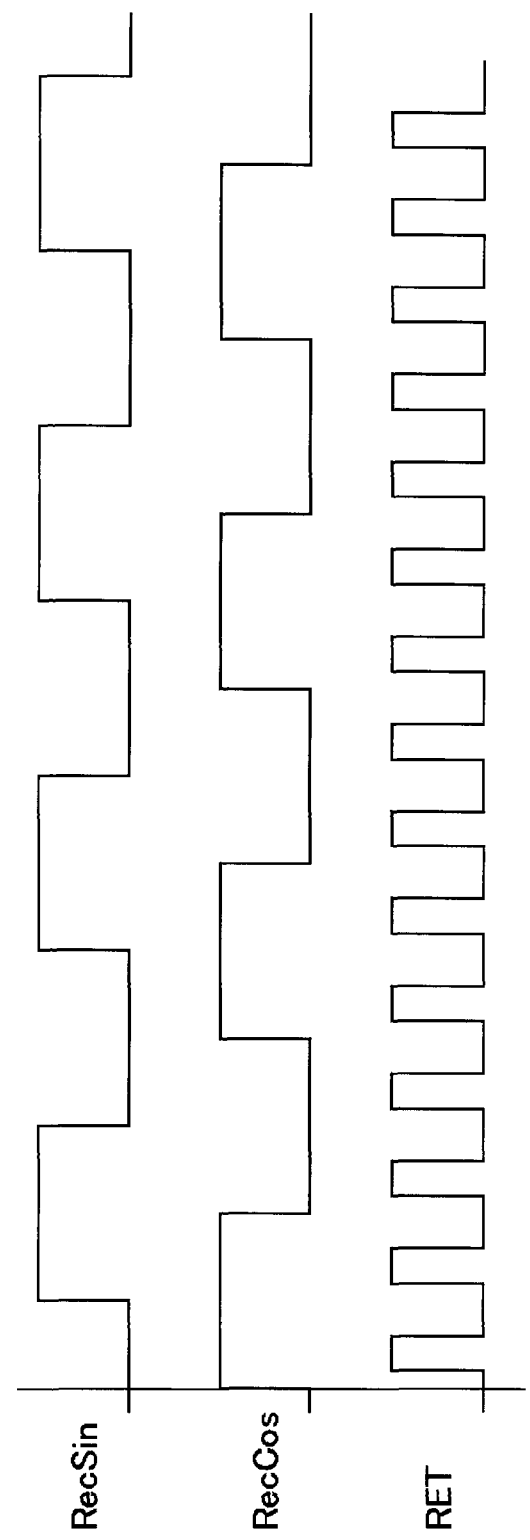
FIG. 7 is a time chart illustrating operations of a retiming pulse generator.

For example, the retiming pulse RET can be suitably generated by the retiming pulse generator 36 in FIG. 6. The retiming pulse generator 36 includes logic gates NOT1 and NOT2, pulsars P1 through P4, delay circuits D1 through D4 and a gate OR10. The gates NOT1 and NOT2 invert the carrier signals RecSin and RecCos. Each of the pulsars P1 through P4 generates a pulse that is at the high-level for a predetermined time from the positive edge of an input signal. The delay circuits D1 through D4 respectively provide predetermined delays to pulses from the corresponding pulsars P1 through P4. The gate OR10 outputs a logical OR of the delay circuits D1 through D4 as the retiming pulse RET. FIG. 7 is a time chart illustrating operations of the retiming pulse generator 36.

Referring back to FIG. 6, the 7-level D/A converter 32 converts 3-bit data B2 through B0 held by the latches L1 through L3, into analog signals. The linear amplifier 34 amplifies, if necessary, the output of the 7-level D/A converter 32 to output the amplified output as the modulated signal M, the amplitude of which is discretized into 7 levels. When the 7-level D/A converter 32 has sufficient load driving capability, the linear amplifier 34 can be omitted.

Figure 8:
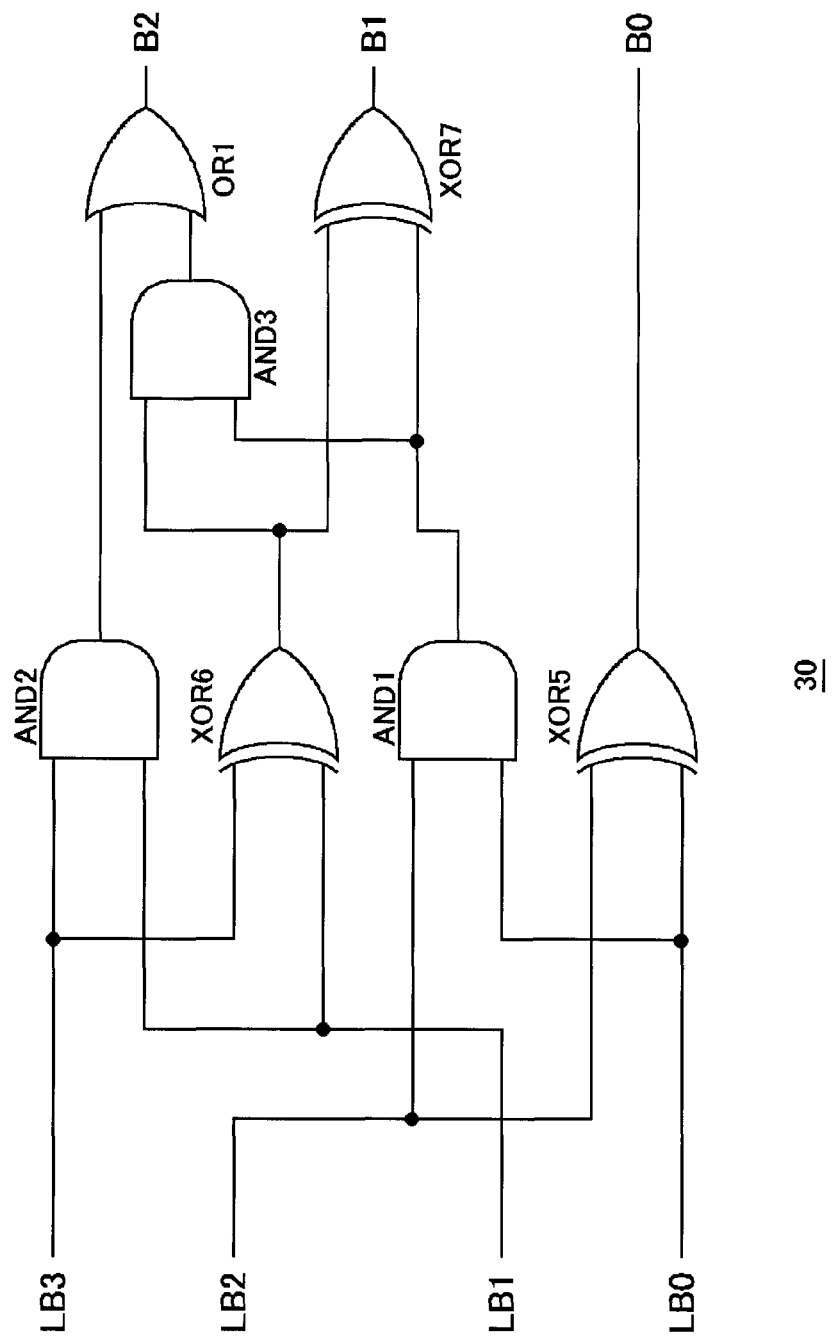
FIG. 8 is a circuit diagram illustrating an example of the structure of a digital adder.

FIG. 8 is a circuit diagram illustrating an example of the structure of the digital adder 30. The digital adder 30 is a so-called ripple carry adder, which includes logic gates XOR5, XOR7, AND1 through AND3 and OR1.

The fifth exclusive OR gate XOR5 receives an output LB0 of the first exclusive OR gate XOR1 and an output LB2 of the third exclusive OR gate XOR3. The sixth exclusive OR gate XOR6 receives an output LB1 of the second exclusive OR gate XOR2 and an output LB3 of the fourth exclusive OR gate XOR4. The first AND gate AND1 receives an output LB0 of the first exclusive OR gate XOR1 and an output LB2 of the third exclusive OR gate XOR3. The second AND gate AND2 receives an output LB1 of the second exclusive OR gate XOR2 and an output LB3 of the fourth exclusive OR gate XOR4. The third AND gate AND3 receives an output of the first AND gate AND1 and an output of the sixth exclusive OR gate XOR6. The seventh exclusive OR gate XOR7 receives the output of the first AND gate AND1 and the output of the sixth exclusive OR gate XOR6. The first OR gate OR1 receives an output of the second AND gate AND2 and an output of the third AND gate AND3. An output B0 of the fifth exclusive OR gate XOR5, that B1 of the seventh exclusive OR gate XOR7 and that B2 of the first OR gate OR1, are outputted as an addition result.

Figure 9B:
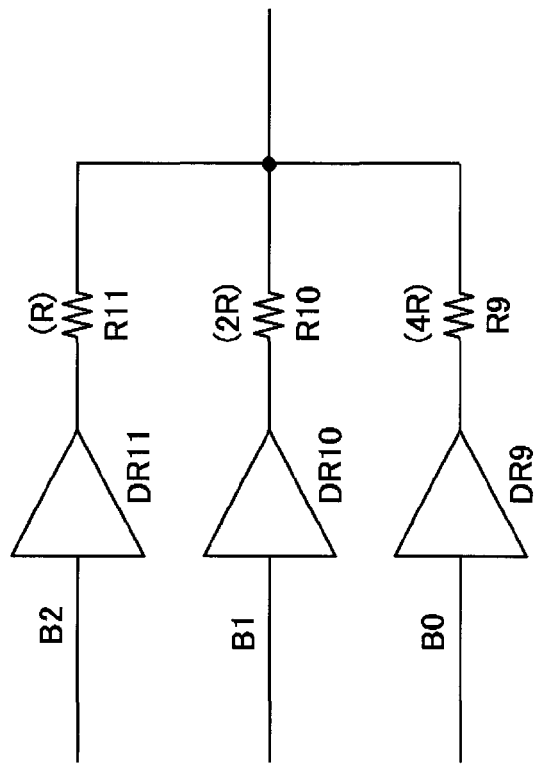
FIGS. 9A and 9B are diagrams illustrating an example of the structure of a seven-level D/A converter in FIG. 6.
Figure 9A:
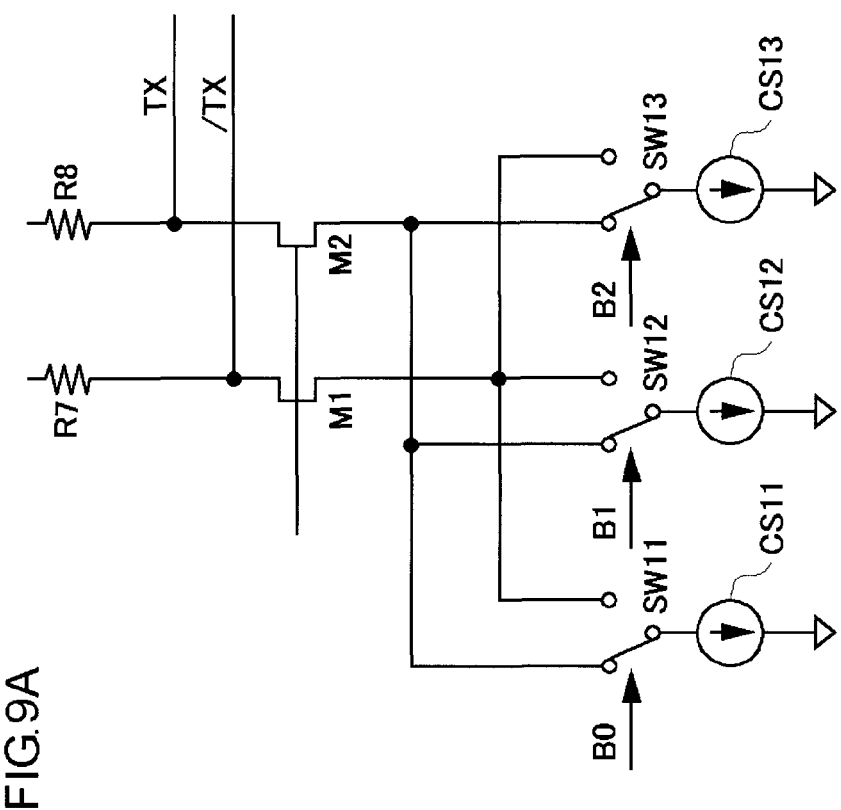

FIGS. 9A and 9B are diagrams illustrating an example of the structure of the 7-level D/A converter 32 in FIG. 6. A 7-level D/A converter 32 in FIG. 9A is a current addition type, which includes switches SW11 through SW13, current sources CS11 through CS13, transistors M1 and M2, and resistors R7 and R8. An operation of each of the switches SW11 through SW13 is as illustrated in FIG. 4B.

Conduct states of the eleventh switch SW11 through the thirteenth switch SW13 are respectively controlled in accordance with the first bits B0 through B2 of the outputs of the digital adder 30. An electric potential at one end of each of the seventh resistor R7 and the eighth resistor R8, is fixed. The first transistor M1 is provided between the other end of the seventh resistor R7 and the second terminals (T2) of the switches SW11 through SW13, which are connected in common. The second transistor M2 is provided between the other end of the eighth resistor R8 and the first terminals (T1) of the switches SW11 through SW13, which are connected in common. The current sources CS11 through CS13 respectively supply currents to the third terminals (T3) of the switches SW11, SW12 and SW13. A current value ratio among the current sources CS11, CS12 and CS13 is set to 1:2:4. The D/A converter 32 outputs electric potentials TX and /TX at the other ends of the respective seventh resistor R7 and the eighth resistor R8, as a differential signal.

A 7-level D/A converter 32 in FIG. 9B is a voltage addition type, which comprises a plurality of resistors R9 through R11 and drivers DR9 through DR11. The drivers DR9 through DR11 respectively generate binary voltages in accordance with data B2 through B0 from a digital adder 30. One end of each of the resistors R9 through R11 is applied with a voltage from the corresponding drivers DR9 through DR11. The other ends of the resistors R9 through R11 are connected in common. A resistance value ratio among the resistors R9, R10 and R11 is set to 4:2:1. An electric potential at the commonly connected point is outputted.

Figure 10A:
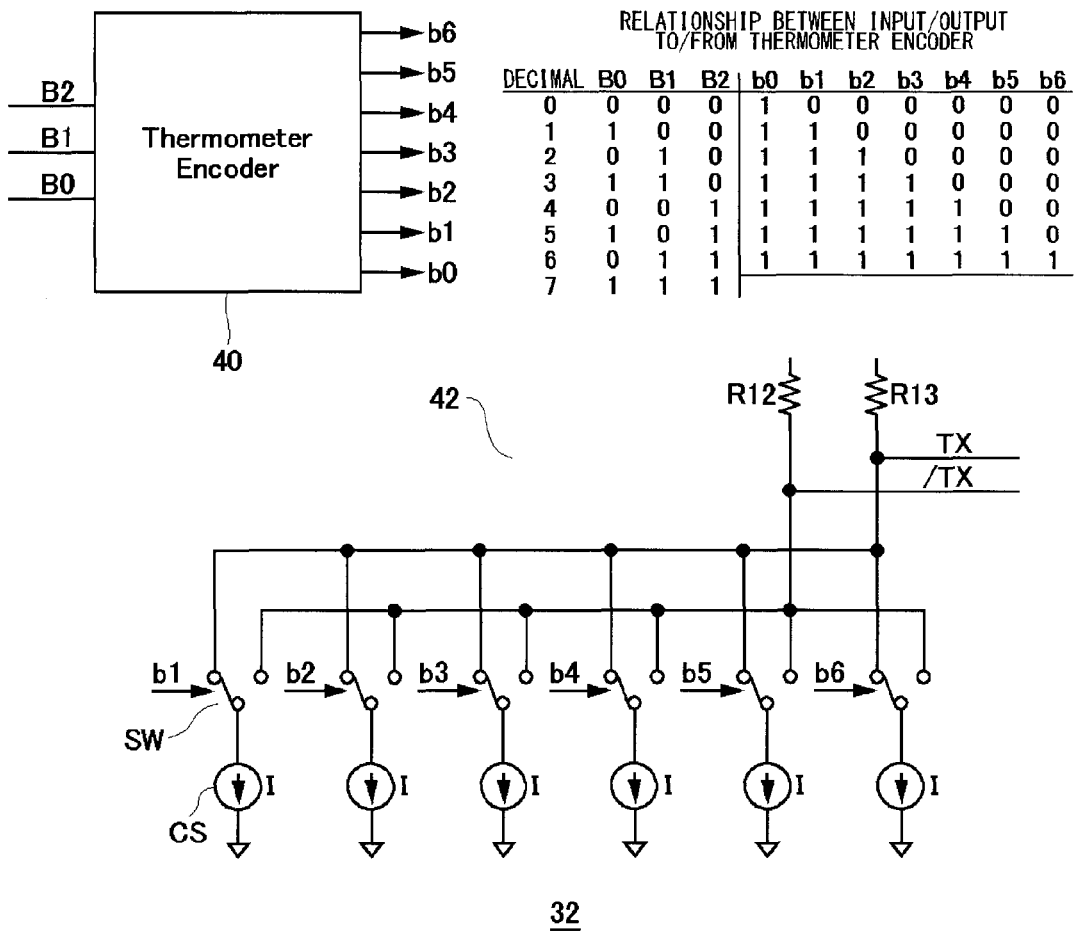
FIGS. 10A and 10B are diagrams illustrating another example of the structure of the 7-level D/A converter in FIG. 6.
Figure 10B:
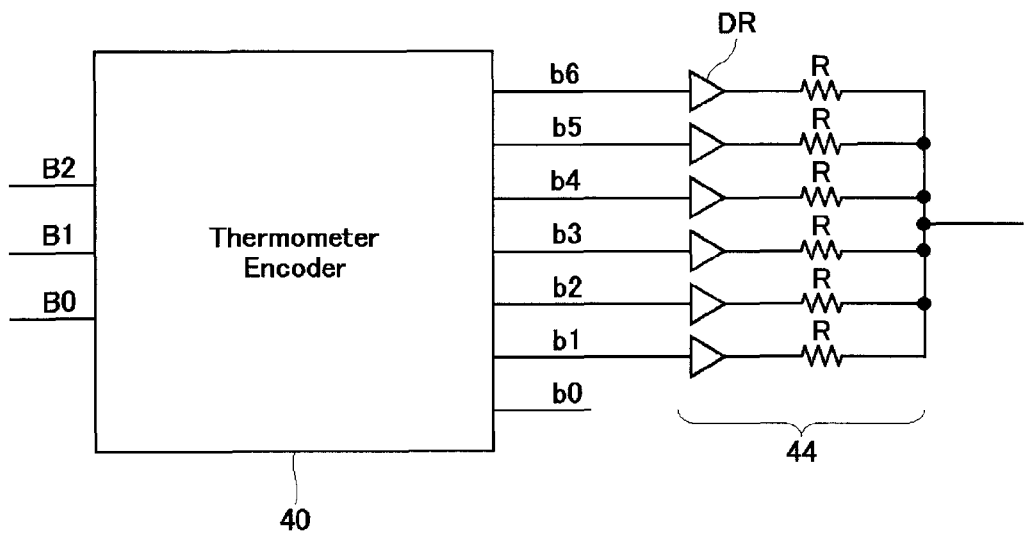

FIGS. 10A and 10B are diagrams illustrating another example of the structure of the 7-level D/A converter 32 in FIG. 6.

A D/A converter 32 in FIG. 10A includes an encoder 40 that converts outputs B2 through B0 of a digital adder 30 into a thermometer code, and a current summing circuit 42 that performs current summing on each bit of the outputs b6 through b0 of the encoder 40 with equal weighting. The current summing circuit 42 comprises a pair of a current source CS and a switch SW for each bit b0 through b6.

According to the 7-level D/A converter 32, each level of the quantized modulated signal M can be arbitrarily and individually adjusted by individually setting a current value of the current source CS for every bit. This structure is useful when the quadrature amplitude modulator 100c is incorporated into a semiconductor test apparatus as stated below. It is because, although the semiconductor test apparatus is required to supply a signal to a DUT under various conditions, a flexible test can be achieved if an amplitude level of the modulated signal M can be arbitrarily adjusted.

The 7-level D/A converter 32 in FIG. 10B may include an encoder 40 that converts the outputs B2 through B0 of the digital adder 30 into a thermometer code, and a voltage summing circuit 44 that performs voltage summing (averaging) on each bit b6 through b0 of the outputs of the encoder 40 with equal weighting. The voltage summing circuit 44 comprises a driver DR for each bit b0 through b6 and a pair of the resistors R.

The fact that the amplitude level of each driver DR can be individually adjusted becomes equivalent to the fact that a current value of the current source CS in FIG. 10A is adjusted.

Subsequently, a preferred application of the quadrature amplitude modulator 100 according to the embodiment will be described. The quadrature amplitude modulator 100 can be used in a test apparatus for testing a semiconductor device capable of receiving a 16-QAM signal as described below, as well as being mounted in a transmission unit of a semiconductor device.

Figure 11:
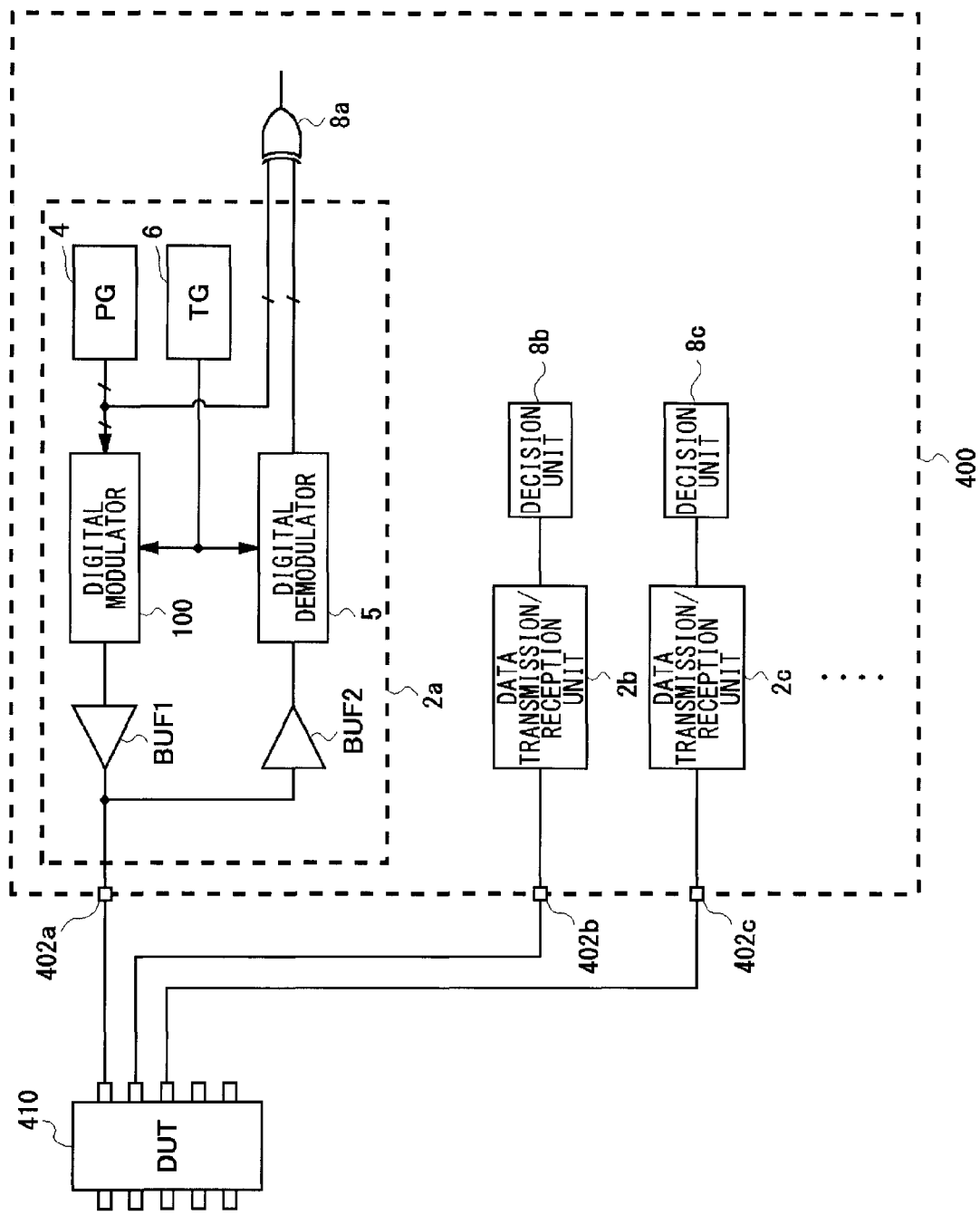
FIG. 11 is a block diagram illustrating the structure of a test apparatus in which the quadrature amplitude modulator according to the embodiments is mounted.

FIG. 11 is a block diagram illustrating the structure of a test apparatus 400 in which the quadrature amplitude modulator 100 according to the embodiment is mounted. The test apparatus 400 comprises a plurality of I/O terminals 402a, 402b and 402c, . . . that are provided for every I/O port of a DUT. The number of the I/O ports is arbitrary; however, in the case of a memory or an MPU, tens to more than 100 I/O ports are provided. Each of the plurality of I/O terminals 402 is connected to the corresponding I/O port of the DUT 410 via a transmission line.

The test apparatus 400 comprises a plurality of data transmission/reception units 2a, 2b and 2c . . . , and decision units 8a, 8b and 8c . . . , each of which is provided for each of the plurality of I/O terminals 402a, 402b and 402c, . . . Because the plurality of data transmission/reception units 2 and the decision units 8 respectively have the same structures to each other, only the structures of the data transmission/reception unit 2a and the decision unit 8a will be illustrated in detail.

Each data transmission/reception unit 2 comprises: (1) a means for modulating a carrier signal (carrier wave) having a rectangular wave or a trapezoidal wave into a multi-level QAM signal, with pattern data (baseband data) to be supplied to the DUT 410 being a modulating signal, so that the multi-level QAM signal is outputted to the corresponding I/O port of the DUT 410; and (2) a means for receiving the modulated signal outputted from the DUT 410 and demodulating the signal. The demodulated data is compared with an expected value to determine pass/fail of the DUT 410.

The data transmission/reception unit 2 comprises a pattern generator 4, a timing generator 6, an output buffer BUF1, an input buffer BUF2, a digital modulator 100 and a digital demodulator 5.

The pattern generator 4 generates a test pattern to be supplied to the DUT 410. Each data (also referred to as pattern data) of the test pattern has a bit number in accordance with a format for digital modulation/demodulation used for transmitting data between the DUT 410 and the test apparatus 400. For example, in the case of the 16-QAM, each data has 4 bits; and in the case of the 64-QAM, each data has 6 bits.

The timing generator 6 generates a timing signal and outputs the signal to the digital modulator 100. The timing generator 6 can adjust the phase of the timing signal finely, for example, in the order of several ps to several ns, for every cycle of the pattern data. The timing generator 6 and the pattern generator 4 can use a known circuit used in a test apparatus for a system in which a conventional binary transmission is performed.

The digital modulator 100 generates a quadrature amplitude modulated signal (for example, the 16-QAM) in accordance with the pattern data such that the modulated signal is outputted as a test signal. The test signal is outputted to the DUT 410 by the output buffer BUF1. The digital modulator 100 is structured by using the architecture of the quadrature amplitude modulator 100 stated above.

The input buffer BUF2 receives a signal to be tested, which is outputted from the DUT 410, and outputs the signal to the digital demodulator 5. The digital demodulator 5 demodulates the modulated signal to extract digital data. The decision unit 8a compares the data demodulated by the digital demodulator 5 with the expected vale outputted from the pattern generator 4. The output buffer BUF1 and the input buffer BUF2 may be structured as a bidirectional buffer.

The structure of the test apparatus 400 has been described above. According to the test apparatus 400, a multi-level QAM signal can be generated based on a logic circuit, and hence, design of the test apparatus becomes easy and the test apparatus can be produced at a reduced cost.

The present invention has been described based on the embodiments, which is only intended to illustrate the principle and applications of the invention, and a variety of modifications and variations in arrangement may be made to the embodiments within the range not departing from the spirit of the invention specified in appended claims.

The invention claimed is:

1. A quadrature amplitude modulator configured to receive 2-bit, 4-level in-phase baseband data and 2-bit, 4-level quadrature baseband data, and to generate a modulated signal by performing 16-level quadrature amplitude modulation, the quadrature amplitude modulator comprising:

an oscillator configured to generate an in-phase carrier signal, said in-phase carrier signal having at least one of a rectangular wave, a trapezoidal wave and another waveform having constant levels at its peak and its bottom of its cycle, and a quadrature carrier signal, the phase of which is shifted by ¼ cycle relative to the in-phase carrier signal;

a first switch including first, second and third terminals configured to electrically connect the first terminal and the third terminal or the second terminal and the third terminal together, in accordance with the first bit of the in-phase baseband data;

a first current source connected to the third terminal of the first switch configured to generate a predetermined reference current;

a second switch including first, second and third terminals configured to connect the third terminal to the first terminal of the first switch, and configured to electrically connect the first terminal and the third terminal or the second terminal and the third terminal together, in accordance with the second bit of the in-phase baseband data;

a third switch including first, second and third terminals configured to connect the third terminal to the second terminal of the first switch, and configured to electrically connect the first terminal and the third terminal or the second terminal and the third terminal together, in accordance with the second bit of the in-phase baseband data;

a second current source connected to the third terminal of the third switch configured to generate a current two times larger than the reference current;

a fourth switch including first, second and third terminals configured to connect the third terminal to the second terminal of the second switch and the first terminal of the third switch, and configured to electrically connect the first terminal and the third terminal or the second terminal and the third terminal together, in accordance with the in-phase carrier signal;

a fifth switch including first, second and third terminals configured to connect the third terminal to the first terminal of the second switch and the second terminal of the third switch, and configured to electrically connect the first terminal and the third terminal or the second terminal and the third terminal together, in accordance with the in-phase carrier signal;

a sixth switch including first, second and third terminals configured to electrically connect the first terminal and the third terminal or the second terminal and the third terminal together, in accordance with the first bit of the quadrature baseband data;

a third current source connected to the third terminal of the sixth switch configured to generate a predetermined reference current;

a seventh switch including first, second and third terminals configured to connect the third terminal to the first terminal of the sixth switch, and configured to electrically connect the first terminal and the third terminal or the second terminal and the third terminal together, in accordance with the second bit of the quadrature baseband data;

an eighth switch including first, second and third terminals configured to connect the third terminal to the second terminal of the sixth switch, and configured to electrically connect the first terminal and the third terminal or the second terminal and the third terminal together, in accordance with the second bit of the quadrature baseband data;

a fourth current source connected to the third terminal of the eighth switch configured to generate a current two times larger than the reference current;

a ninth switch including first, second and third terminals configured to connect the third terminal to the second terminal of the seventh switch and the first terminal of the eighth switch, and configured to electrically connect the first terminal and the third terminal or the second terminal and the third terminal together, in accordance with the quadrature carrier signal;

a tenth switch including first, second and third terminals configured to connect the third terminal to the first terminal of the seventh switch and the second terminal of the eighth switch, and configured to electrically connect the first terminal and the third terminal or the second terminal and the third terminal together, in accordance with the quadrature carrier signal;

a first resistor, one end of which is configured to be applied with a reference voltage, and the other end of which is configured to be connected to the first terminal of the fourth switch, to the second terminal of the fifth switch, to the first terminal of the ninth switch and to the second terminal of the tenth switch; and a second resistor, one end of which is configured to be applied with the reference voltage, and the other end of which is configured to be connected to the second terminal of the fourth switch, to the first terminal of the fifth switch, to the second terminal of the ninth switch and to the first terminal of the tenth switch, wherein a signal occurring at least one of the other ends of the first and the second resistors is outputted as the modulated signal, the amplitude of which is discretized.

2. A test apparatus configured to supply a digital multi-level modulated test signal to a device under test, the test apparatus comprising:

a pattern generator configured to generate test data including in-phase and quadrature baseband data; and the quadrature amplitude modulator according to claim 1, configured to receive the test data and to generate a modulated signal.

3. A semiconductor apparatus comprising:

a functional device configured to have a plurality of input/output ports; and the quadrature amplitude modulator according to claim 1 configured to perform digital modulation on data outputted from the input/output ports of the functional device, and to output the modulated data to outside.

4. A quadrature amplitude modulator configured to receive 2-bit, 4-level in-phase baseband data and 2-bit, 4-level quadrature baseband data, and to generates a modulated signal by performing 16-level quadrature amplitude modulation, the quadrature amplitude modulator comprising:

an oscillator configured to generate an in-phase carrier signal, said in-phase carrier signal having at least one of a rectangular wave, a trapezoidal wave and another waveform having constant levels at its peak and its bottom of its cycle, and a quadrature carrier signal, the phase of which is shifted by ¼ cycle relative to the in-phase carrier signal;

a first exclusive NOR gate configured to receive the first bit and the second bit of the in-phase baseband data;

a first exclusive OR gate configured to receive an output of the first exclusive NOR gate and the in-phase carrier signal;

a second exclusive OR gate configured to receive the second bit of the in-phase baseband data and the in-phase carrier signal;

a second exclusive NOR gate configured to receive the first bit and the second bit of the quadrature baseband data;

a third exclusive OR gate configured to receive an output of the second exclusive NOR gate and the quadrature carrier signal;

a fourth exclusive OR gate configured to receive the second bit of the quadrature baseband data and the quadrature carrier signal;

a third resistor, one end of which is configured to be applied with a voltage in accordance with an output of the first exclusive OR gate;

a fourth resistor, one end of which is configured to be applied with a voltage in accordance with an output of the second exclusive OR gate;

a fifth resistor, one end of which is configured to be applied with a voltage in accordance with an output of the third exclusive OR gate; and a sixth resistor, one end of which is configured to be applied with a voltage in accordance with an output of the fourth exclusive OR gate, wherein resistance values of the fourth and the sixth resistors are equal to each other, and those of the third and the fifth resistors are respectively two times larger than those of the fourth and the sixth resistors, and wherein the other ends of the third, the fourth, the fifth and the sixth resistors are connected in common such that a voltage occurring at the commonly connected point is outputted as the modulated signal, the amplitude of which is discretized.

5. A semiconductor apparatus comprising:

a functional device configured to have a plurality of input/output ports; and the quadrature amplitude modulator according to claim 4 configured to perform digital modulation on data outputted from the input/output ports of the functional device, and to output the modulated data to outside.

6. A test apparatus configured to supply a digital multi-level modulated test signal to a device under test, the test apparatus comprising:

a pattern generator configured to generate test data including in-phase and quadrature baseband data; and the quadrature amplitude modulator according to claim 4, configured to receive the test data and to generate a modulated signal.

7. A quadrature amplitude modulator configured to receive 2-bit, 4-level in-phase baseband data and 2-bit, 4-level quadrature baseband data, and to generate a modulated signal by performing 16-level quadrature amplitude modulation, the quadrature amplitude modulator comprising:

an oscillator configured to generate an in-phase carrier signal, said in-phase carrier signal having at least one of a rectangular wave, a trapezoidal wave and another waveform having constant levels at its peak and its bottom of its cycle, and a quadrature carrier signal, the phase of which is shifted by ¼ cycle relative to the in-phase carrier signal;

a first exclusive NOR gate configured to receive the first bit and the second bit of the in-phase baseband data;

a first exclusive OR gate configured to receive an output of the first exclusive NOR gate and the in-phase carrier signal;

a second exclusive OR gate configured to receive the second bit of the in-phase baseband data and the in-phase carrier signal;

a second exclusive NOR gate configured to receive the first bit and the second bit of the quadrature baseband data;

a third exclusive OR gate configured to receive an output of the second exclusive NOR gate and the quadrature carrier signal;

a fourth exclusive OR gate configured to receive the second bit of the quadrature baseband data and the quadrature carrier signal;

an adder configured to add outputs of the first, the second, the third and the fourth exclusive OR gates; and a D/A converter configured to convert an output of the adder into an analog signal, wherein an output signal of the D/A converter is outputted as the modulated signal, the amplitude of which is discretized.

8. The quadrature amplitude modulator according to claim 7 further comprising a latch circuit configured to latch the output of the adder in accordance with a timing pulse, wherein the timing pulse is asserted at every edge of the in-phase carrier signal and the quadrature carrier signal.

9. The quadrature amplitude modulator according to claim 7, wherein the adder include:

a fifth exclusive OR gate configured to receive outputs of the first exclusive OR gate and the third exclusive OR gate;

a sixth exclusive OR gate configured to receive outputs of the second exclusive OR gate and the fourth exclusive OR gate;

a first AND gate configured to receive the outputs of the first exclusive OR gate and the third exclusive OR gate;

a second AND gate configured to receive the outputs of the second exclusive OR gate and the fourth exclusive OR gate;

a third AND gate configured to receive outputs of the first AND gate and the sixth exclusive OR gate;

a seventh exclusive OR gate configured to receive the outputs of the first AND gate and the sixth exclusive OR gate; and a first OR gate configured to receive outputs of the second AND gate and the third AND gate, and wherein outputs of the fifth exclusive OR gate, the seventh exclusive OR gate and the first OR gate, are outputted as an addition result.

10. The quadrature amplitude modulator according to claim 7, wherein the D/A converter includes:

an eleventh switch including first, second and third terminals configured to electrically connect the first terminal and the third terminal or the second terminal and the third terminal together, in accordance with the first bit of the output of the adder;

a twelfth switch including first, second and third terminals configured to electrically connect the first terminal and the third terminal or the second terminal and the third terminal together, in accordance with the second bit of the output of the adder;

a thirteenth switch including first, second and third terminals configured electrically connect the first terminal and the third terminal or the second terminal and the third terminal together, in accordance with the third bit of the output of the adder;

a seventh resistor, an electric potential at one end of which is fixed;

an eighth resistor, an electric potential at one end of which is fixed;

a first transistor configured to be provided between the other end of the seventh resistor and the second terminals of the eleventh, the twelfth and the thirteenth switches, which are connected in common;

a second transistor configured to be provided between the other end of the eighth resistor and the first terminals of the eleventh, the twelfth and the thirteenth switches, which are connected in common; and eleventh, twelfth and thirteenth current sources configured to supply currents to the respective third terminals of the eleventh, the twelfth and the thirteenth switches, wherein a ratio of current values of the eleventh, the twelfth and the thirteenth current sources is 1:2:4, and wherein the D/A converter outputs an electric potential at each of the other ends of the seventh and the eighth resistors.

11. The quadrature amplitude modulator according to claim 7, wherein the D/A converter includes:

a ninth resistor, to one end of which a voltage corresponding to the first bit of the output of the adder is applied;

a tenth resistor, to one end of which a voltage corresponding to the second bit thereof is applied; and an eleventh resistor, to one end of which a voltage corresponding to the third bit thereof is applied, and wherein a ratio of resistance values of the ninth, the tenth and the eleventh resistors is 4:2:1, and wherein each of the other ends of the three resistors is connected in common, and a voltage occurring at the commonly connected point is outputted.

12. The quadrature amplitude modulator according to claim 7, wherein the D/A converter includes:

an encoder configured to convert the output of the adder into a thermometer code; and a current summing circuit configured to perform current summing on each bit of an output of the encoder with equal weighting.

13. The quadrature amplitude modulator according to claim 7, wherein the D/A converter includes:

an encoder configured to convert the output of the adder into a thermometer code; and a voltage summing circuit configured to perform voltage summing on each bit of an output of the encoder with equal weighting.

14. A semiconductor apparatus comprising:

a functional device configured to have a plurality of input/output ports; and the quadrature amplitude modulator according to claim 7 configured to perform digital modulation on data outputted from the input/output ports of the functional device, and to output the modulated data to outside.

15. A test apparatus configured to supply a digital multi-level modulated test signal to a device under test, the test apparatus comprising:

a pattern generator configured to generate test data including in-phase and quadrature baseband data; and the quadrature amplitude modulator according to claim 7, configured to receive the test data and to generate a modulated signal.

* * * * *